(12) United States Patent
Nakajima et al.

(10) Patent No.: US 12,377,432 B2
(45) Date of Patent: Aug. 5, 2025

(54) PRINTING APPARATUS

(71) Applicant: SEIKO EPSON CORPORATION, Tokyo (JP)

(72) Inventors: Yoshinori Nakajima, Matsumoto (JP); Yuki Ishii, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 185 days.

(21) Appl. No.: 18/049,677

(22) Filed: Oct. 26, 2022

(65) Prior Publication Data

US 2023/0139508 A1 May 4, 2023

(30) Foreign Application Priority Data

Oct. 28, 2021 (JP) ................................. 2021-176205

(51) Int. Cl.
*B05B 13/04* (2006.01)
*B05B 7/08* (2006.01)
*B05C 5/02* (2006.01)

(52) U.S. Cl.
CPC ............ *B05B 13/0431* (2013.01); *B05B 7/08* (2013.01); *B05C 5/0225* (2013.01)

(58) Field of Classification Search
USPC ................ 118/323, 321, 313, 315, 712, 713, 118/679–682; 347/13, 40, 42, 43
See application file for complete search history.

(56) References Cited

U.S. PATENT DOCUMENTS

| 2012/0249651 A1* | 10/2012 | Akiyama | ........... B41J 11/00212 347/16 |
| 2022/0105722 A1* | 4/2022 | Kubo | ..................... B41J 25/304 |

FOREIGN PATENT DOCUMENTS

| JP | 2002225256 | 8/2002 |
| JP | 2016-215438 A | 12/2016 |

* cited by examiner

*Primary Examiner* — Yewebdar T Tadesse
(74) *Attorney, Agent, or Firm* — WORKMAN NYDEGGER

(57) ABSTRACT

A printing apparatus includes a head and a robot which moves the head with respect to a workpiece, the head includes a first nozzle row for ejecting a first and a second nozzle row for ejecting a second ink which has lower brightness than the first ink, the robot includes an arm portion having a distal end, a proximal end, and a plurality of joints, and a base portion coupled to the proximal end, and supports the head by the distal end, and when a timing at which the first ink is ejected to a predetermined position on the workpiece is defined as a first timing, and a timing at which the second ink is ejected to the predetermined position is defined as a second timing, a distance between the distal end and the proximal end at the second timing is less than the first timing.

14 Claims, 14 Drawing Sheets

PRINTING APPARATUS

The present application is based on, and claims priority from JP Application Serial Number 2021-176205, filed Oct. 28, 2021, the disclosure of which is hereby incorporated by reference herein in its entirety.

BACKGROUND

1. Technical Field

The present disclosure relates to a printing apparatus.

2. Related Art

An ink jet type printing apparatus using a robot such as an articulated robot is known. For example, the apparatus described in JP-A-2016-215438 includes a head that is an ink jet head and a robot that holds the head.

When performing printing using a plurality of colors of ink, the head is generally provided with a plurality of nozzle rows for each color of the ink. JP-A-2016-215438 does not describe the arrangement of a plurality of nozzle rows when ejecting a plurality of colors of ink. In a printing apparatus in which a head is moved by using a robot, when performing printing using a plurality of colors of ink, it is desired to realize an appropriate arrangement of a plurality of nozzle rows so that good print quality can be obtained.

SUMMARY

According to an aspect of the present disclosure, there is provided a printing apparatus including: a head including a first nozzle row in which a plurality of nozzles for ejecting a first ink are arranged and a second nozzle row in which a plurality of nozzles for ejecting a second ink are arranged; and a robot which includes an arm portion having a distal end, a proximal end, and a plurality of joints, and a base portion coupled to the proximal end, supports the head by the distal end, and changes a position and a posture of the head with respect to a workpiece, in which a brightness of the second ink is lower than a brightness of the first ink, and when a timing at which the first ink is ejected from the first nozzle row to a predetermined position on the workpiece is defined as a first timing, and a timing at which the second ink is ejected from the second nozzle row to the predetermined position is defined as a second timing, a distance between the distal end and the proximal end at the second timing is less than a distance between the distal end and the proximal end at the first timing.

According to another aspect of the present disclosure, there is provided a printing apparatus including: a head including a first nozzle row in which a plurality of nozzles for ejecting a first ink are arranged and a second nozzle row in which a plurality of nozzles for ejecting a second ink are arranged; and a robot which includes an arm portion having a distal end, a proximal end, and a plurality of joints, and a base portion coupled to the proximal end, supports the head by the distal end, and changes a position and a posture of the head with respect to a workpiece, in which a brightness of the second ink is lower than a brightness of the first ink, and a distance between the second nozzle row and the proximal end is greater than a distance between the first nozzle row and the proximal end.

DESCRIPTION OF EXEMPLARY EMBODIMENTS

Figure 1:
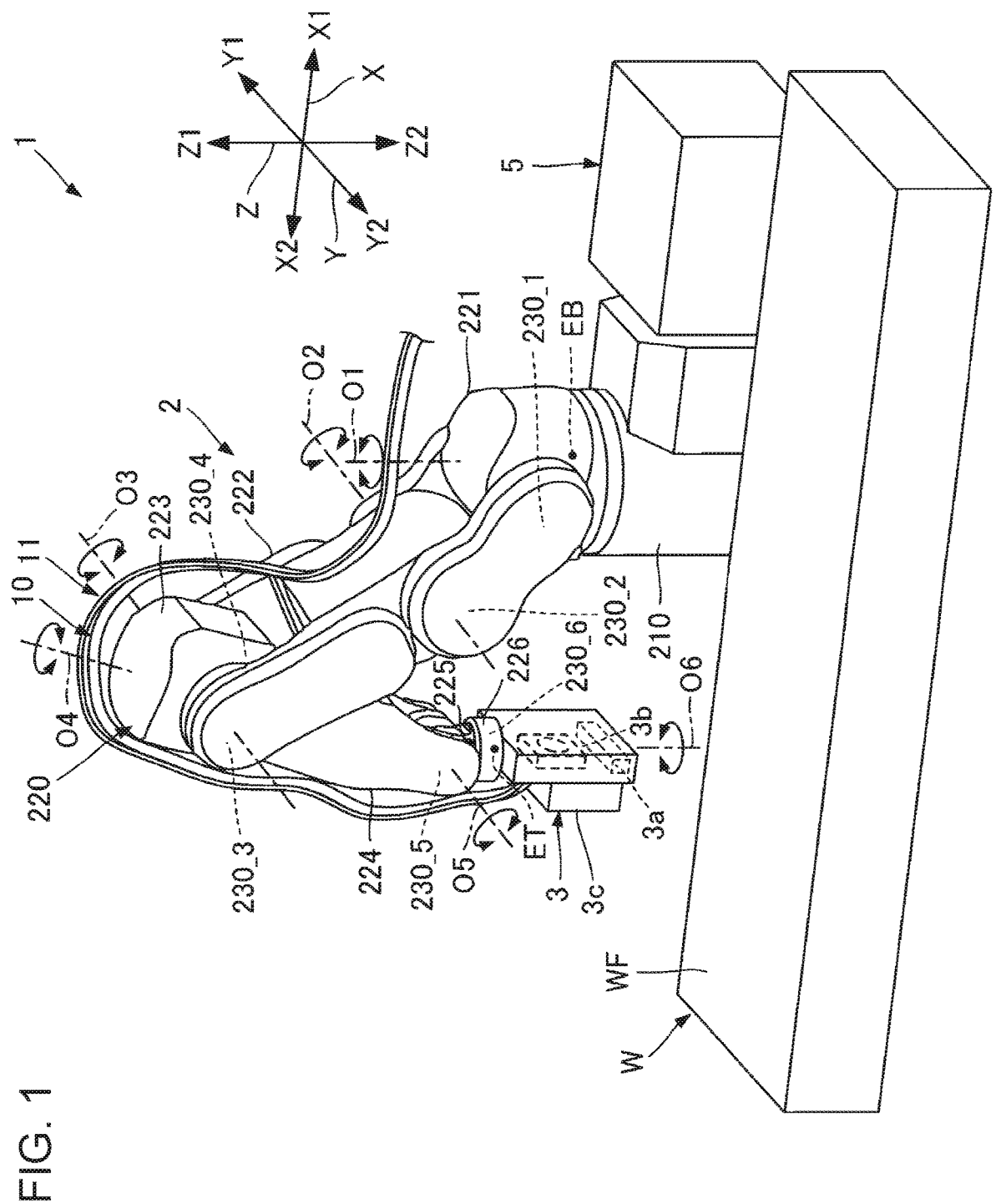
FIG. 1 is a perspective view illustrating an overview of a printing apparatus according to a first embodiment.

Hereinafter, preferred embodiments according to the present disclosure will be described with reference to the attached drawings. In the drawings, the dimensions and scale of each section may differ from the actual ones, and some parts are schematically illustrated for ease of understanding. Further, the scope of the present disclosure is not limited to these aspects unless otherwise stated to limit the disclosure in the following description.

In the following description, for convenience, an X axis, a Y axis, and a Z axis that intersect each other are appropriately used. In addition, in the following, one direction along the X axis is an X1 direction, and the direction opposite to the X1 direction is an X2 direction. Similarly, the directions opposite to each other along the Y axis are a Y1 direction and a Y2 direction. In addition, the directions opposite to each other along the Z axis are a Z1 direction and a Z2 direction.

Here, the X axis, the Y axis, and the Z axis correspond to the coordinate axes of the world coordinate system set in the space where a robot 2 described later is installed. Typically, the Z axis is a vertical axis, and the Z2 direction corresponds to a downward direction in the vertical direction. A base coordinate system based on the position of a base portion 210 described later of the robot 2 is associated with the world coordinate system by calibration. In the following, for convenience, a case where the operation of the robot 2 is controlled by using the world coordinate system as the robot coordinate system is exemplified.

The Z axis does not have to be a vertical axis. Further, the X axis, the Y axis, and the Z axis are typically orthogonal to each other, but the present disclosure is not limited thereto, and the X axis, the Y axis, and the Z axis may not be orthogonal to each other. For example, the X axis, Y axis, and Z axis may intersect each other at an angle within the range of 80° or more and 100° or less.

1. FIRST EMBODIMENT

1-1. Overview of Printing Apparatus

FIG. 1 is a perspective view illustrating an overview of a printing apparatus 1 according to a first embodiment. A printing apparatus 1 is an apparatus that performs printing on the surface of a workpiece W by an ink jet method.

The workpiece W has a surface WF to be printed. In the example illustrated in FIG. 1, the workpiece W is a rectangular parallelepiped and the surface WF is a plane. The workpiece W at the time of printing is supported by a structure such as a predetermined installation table, a robot hand, or a conveyor, if necessary. The shape or size of the workpiece W or the surface WF is not limited to the example illustrated in FIG. 1, and is any shape or size. For example, the surface WF may have a curved or bent part, or the workpiece W may be a sheet material such as paper or cloth. Further, the position or posture of the workpiece W or the surface WF at the time of printing may be any position or posture as long as printing can be performed, and is not limited to the example illustrated in FIG. 1.

As illustrated in FIG. 1, the printing apparatus 1 includes a robot 2, a head unit 3, a controller 5, a piping section 10, and a wiring section 11. Hereinafter, first, these will be briefly described in order.

The robot 2 is a robot that changes the position and posture of the head unit 3 in the world coordinate system. In the example illustrated in FIG. 1, the robot 2 is a so-called 6-axis vertical articulated robot.

As illustrated in FIG. 1, the robot 2 has a base portion 210 and an arm portion 220.

The base portion 210 is a platform that supports the arm portion 220. In the example illustrated in FIG. 1, the base portion 210 is fixed to a floor surface facing the Z1 direction or an installation surface such as a base by screwing or the like. The installation surface to which the base portion 210 is fixed may be a surface facing in any direction, and is not limited to the example illustrated in FIG. 1, and may be, for example, a surface having a wall, a ceiling, a movable cart, or the like.

The arm portion 220 is a 6-axis robot arm having a proximal end EB attached to the base portion 210 and a distal end ET that changes the position and posture three-dimensionally with respect to the proximal end EB. Specifically, the arm portion 220 has arms 221, 222, 223, 224, 225 and 226, also referred to as links. These are coupled in the order of arms 221, 222, 223, 224, 225 and 226.

The arm 221 is rotatably coupled to the base portion 210 around a rotating axis O1 via a joint 230_1. The arm 222 is rotatably coupled to the arm 221 around a rotating axis O2 via a joint 230_2. The arm 223 is rotatably coupled to the arm 222 around a rotating axis O3 via a joint 230_3. The arm 224 is rotatably coupled to the arm 223 around a rotating axis O4 via a joint 230_4. The arm 225 is rotatably coupled to the arm 224 around a rotating axis O5 via a joint 230_5. The arm 226 is rotatably coupled to the arm 225 around a rotating axis O6 via a joint 230_6.

Each of the joints 230_1 to 230_6 is a mechanism for rotatably coupling one of two adjacent members of the base portion 210 and the arms 221 to 226 to the other. In the following, each of the joints 230_1 to 230_6 may be referred to as "joint 230". Here, the proximal end EB is one end of the arm portion 220 of which the position in the base coordinate system does not change even when the joint 230 turns, and the distal end ET is the other end of the arm portion 220 of which the position in the base coordinate system changes due to the rotating of the joint 230_6. The proximal end EB can be defined, for example, as an intersection between the boundary between the base portion 210 and the arm 221 and the rotating axis O1. Further, the distal end ET can be defined as, for example, the intersection between the end surface of the arm 226, which is most distant from the arm 225, or the surface that extends the end surface, and the rotating axis O6.

Although not illustrated in FIG. 1, each of the joints 230_1 to 230_6 is provided with a driving mechanism for rotating one of the two corresponding members with respect to the other. The driving mechanism includes, for example, a motor that generates a driving force for the rotation, a speed reducer that decelerates and outputs the driving force, and an encoder such as rotary encoder that detects an operating amount such as an angle of the rotating. The aggregate of the driving mechanisms of the joints 230_1 to 230_6 corresponds to an arm driving mechanism 2a illustrated in FIG. 2 described later.

The rotating axis O1 is an axis perpendicular to the installation surface (not illustrated) to which the base portion 210 is fixed. The rotating axis O2 is an axis perpendicular to the rotating axis O1. The rotating axis O3 is an axis parallel to the rotating axis O2. The rotating axis O4 is an axis perpendicular to the rotating axis O3. The rotating axis O5 is an axis perpendicular to the rotating axis O4. The rotating axis O6 is an axis perpendicular to the rotating axis O5.

Regarding these rotating axes, "vertical" includes not only the case where the angle formed by the two rotating axes is exactly 90°, and but also the case where the angle formed by the two rotating axes is shifted within a range of approximately 90°±5°. Similarly, "parallel" includes not only the case where the two rotating axes are strictly parallel, but also the case where one of the two rotating axes is tilted within a range of approximately ±5° with respect to the other.

The head unit 3 is mounted at the distal end ET of the arm portion 220 of the robot 2 as an end effector in a state of being fixed by screwing or the like.

The head unit 3 is an assembly having a head 3a that ejects a plurality of types of ink having different brightness toward the workpiece W. In the present embodiment, the head unit 3 has not only the head 3a but also a pressure adjusting valve 3b and an energy emitting section 3c. The details of the head unit 3 will be described with reference to FIG. 3 described later.

In the present embodiment, a case where four types of inks such as a first ink, a second ink, a third ink, and a fourth ink having different brightness are used is exemplified. The brightness of these inks are in the order of the first ink, the third ink, the fourth ink, and the second ink from the highest to the lowest. When performing full-color printing, the four types of ink are typically yellow ink, magenta ink, cyan ink, and black ink. In this case, the first ink is yellow ink, the second ink is black ink, one of the third ink and the fourth ink is magenta ink, and the other one of the third ink and the fourth ink is cyan ink. Here, the brightness can be defined by, for example, the brightness of the CIE L*a*b* color space defined by the International Commission on Illumination (CIE). In the present embodiment, the brightness of the CIE L*a*b* color space is 83 for yellow ink, 54 for magenta ink, 56 for cyan ink, and 11 for black ink. The value of the brightness of the ink is obtained by, for example, applying the ink on a medium such as printing paper to create a predetermined color patch, and then by measuring the color patch with a color measuring machine. Here, the brightness of a plurality of types of inks is compared by creating a color patch using the same amount of ink on the same medium for each of the plurality of types of inks, and by comparing the values obtained by measuring the color patch of the plurality of types of inks.

Each such ink is, for example, a liquid medium in which a coloring material such as a dye or a pigment is dissolved or dispersed in a solvent. Each ink may be any one of ink such as a water-based ink in which a coloring material such as a dye or a pigment is dissolved in an aqueous solvent; a curable ink using a curable resin such as an ultraviolet curable type; and a solvent-based ink obtained by dissolving a coloring material such as a dye or a pigment in an organic solvent, but a curable ink is preferably used. The curable ink is not particularly limited, and for example, any of a thermosetting type, a photocurable type, a radiation curable type, an electron beam curable type, and the like, but a photocurable type such as an ultraviolet curable type is preferable. Further, the ink containing the coloring material is not limited to yellow ink, magenta ink, cyan ink, and black ink, and may be, for example, white ink, gray ink, light cyan ink, light magenta ink and the like.

Each of the piping section 10 and the wiring section 11 is coupled to the head unit 3. The piping section 10 is a group of piping that supplies ink from an ink tank (not illustrated) to the head unit 3. The wiring section 11 is a wiring or a wiring group for supplying an electric signal for driving the head 3*a*.

The controller 5 is a robot controller that controls the drive of the robot 2. Hereinafter, the electric configuration of the printing apparatus 1 will be described with reference to FIG. 2, including a detailed description of the controller 5.

1-2. Electric Configuration of Printing Apparatus

Figure 2:
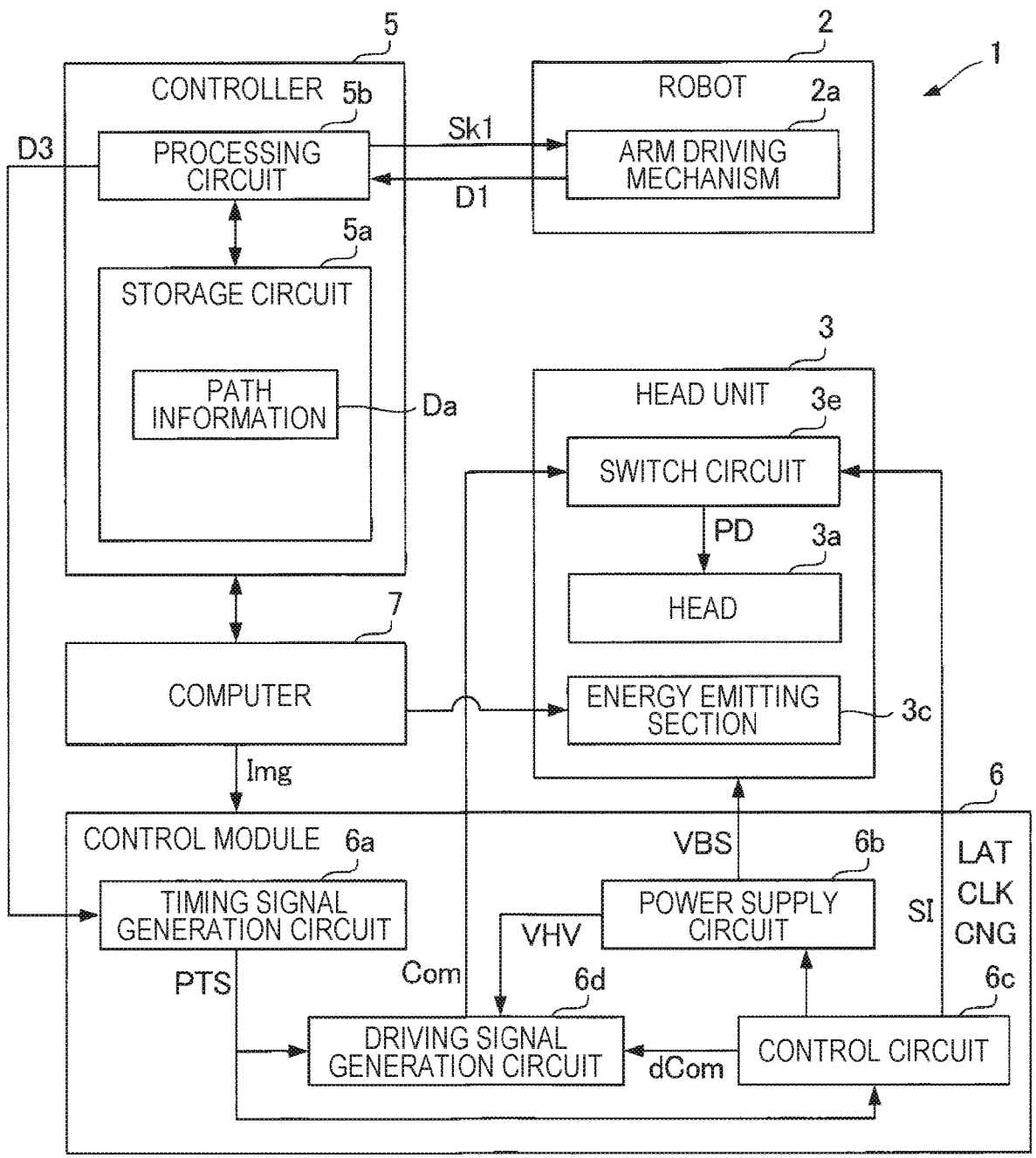
FIG. 2 is a block diagram illustrating an electric configuration of the printing apparatus according to the first embodiment.

FIG. 2 is a block diagram illustrating an electric configuration of the printing apparatus 1 according to the first embodiment. In FIG. 2, among the components of the printing apparatus 1, the electric components are illustrated. As illustrated in FIG. 2, the printing apparatus 1 includes not only the components illustrated in FIG. 1 described above, but also a control module 6 connected to the controller 5 to be capable of communicating therewith, and a computer 7 connected to the controller 5 and the control module 6 to be capable of communicating therewith.

Noted that each of the electric components illustrated in FIG. 2 may be appropriately divided, and a part thereof may be included in another component or may be integrally configured with the other component. For example, a part or the entirety of the functions of the controller 5 or the control module 6 may be realized by the computer 7, or may be realized by another external apparatus such as a personal computer (PC) connected to the controller 5 via a network such as a local area network (LAN) or the Internet.

The controller 5 has a function of controlling the drive of the robot 2 and a function of generating a signal D3 for synchronizing the ink ejection operation of the head unit 3 with the operation of the robot 2.

The controller 5 has a storage circuit 5*a* and a processing circuit 5*b*.

The storage circuit 5*a* stores various programs executed by the processing circuit 5*b* and various data processed by the processing circuit 5*b*. The storage circuit 5*a* includes one or both semiconductor memories, for example, a volatile memory such as a random access memory (RAM); and a non-volatile memory such as a read only memory (ROM), an electrically erasable programmable read-only memory (EEPROM), or a programmable ROM (PROM). A part or the entirety of the storage circuit 5*a* may be included in the processing circuit 5*b*.

Path information Da is stored in the storage circuit 5*a*. The path information Da is information indicating the path through which the head unit 3 moves and the posture of the head unit 3 in the path. The path information Da is generated by using, for example, information acquired by direct teaching, offline teaching, or the like, and information such as computer-aided design (CAD) data indicating the shape of the workpiece W. The path information Da is represented by using, for example, the coordinate values of the base coordinate system or the world coordinate system. The above path information Da is input from the computer 7 into the storage circuit 5*a*.

The processing circuit 5*b* controls the operation of the arm driving mechanism 2*a* of the robot 2 based on the path information Da, and also generates the signal D3. The processing circuit 5*b* is, for example, a processor, such as one or more central processing units (CPU). The processing circuit 5*b* may include a programmable logic device such as a field-programmable gate array (FPGA) instead of the CPU or in addition to CPU.

Here, the arm driving mechanism 2*a* is an aggregate of the driving mechanisms of the joints 230_1 to 230_6 described above, and for each joint 230, a motor for driving the joint 230, and an encoder for detecting the rotation angle of the joint 230 are provided.

The processing circuit 5*b* performs inverse kinematics calculation, which is an arithmetic operation for converting the path information Da into an operating amount such as a rotation angle and a rotation speed of each joint 230 of the robot 2. Then, the processing circuit 5*b* outputs a control signal Sk1 based on an output D1 from each encoder of the arm driving mechanism 2*a* so that the operating amount such as the actual rotation angle and the rotation speed of each joint 230 becomes the above-described arithmetic operation result based on the path information Da. The control signal Sk1 is a signal for controlling the drive of the motor of the arm driving mechanism 2*a*. Here, the control signal Sk1 is corrected by the processing circuit 5*b* based on the output from the distance sensor (not illustrated), if necessary.

Further, the processing circuit 5*b* generates the signal D3 based on the output D1 from at least one of the plurality of encoders of the arm driving mechanism 2*a*. For example, the processing circuit 5*b* generates, as a signal D3, a trigger signal including a pulse at a timing at which the output D1 from one of the plurality of encoders becomes a predetermined value.

The control module 6 is a circuit that controls the ejection operation of the ink from the individual nozzles N of the head unit 3 based on the signal D3 output from the controller 5 and print data Img from the computer 7. The control module 6 includes a timing signal generation circuit 6*a*, a power supply circuit 6*b*, a control circuit 6*c*, and a driving signal generation circuit 6*d*.

The timing signal generation circuit 6*a* generates a timing signal PTS based on the signal D3. The timing signal generation circuit 6*a* is composed of, for example, a timer that starts generation of the timing signal PTS when the signal D3 is detected. The timing signal PTS includes, for example, a pulse defined based on the output D1.

The power supply circuit 6*b* receives power from a commercial power source (not illustrated) and generates various predetermined potentials. The various generated potentials are appropriately supplied to each section of the control module 6 and the head unit 3. For example, the power supply circuit 6b generates a power supply potential VHV and an offset potential VBS. The offset potential VBS is supplied to the head unit 3. Further, the power supply potential VHV is supplied to the driving signal generation circuit 6d.

The control circuit 6c generates a print data signal SI, a waveform designation signal dCom, a latch signal LAT, a clock signal CLK, and a change signal CNG based on the timing signal PTS. These signals are synchronized with the timing signal PTS. Of these signals, the waveform designation signal dCom is input into the driving signal generation circuit 6d, and the other signals are input into a switch circuit 3e of the head unit 3.

The print data signal SI is a digital signal for designating the operating state of the driving element included in the head 3a of the head unit 3. Specifically, the print data signal SI designates whether to supply a driving signal Com, which will be described later, to the driving element based on the print data. By this designation, it is designated, for example, whether to eject ink from the nozzle corresponding to the driving element, or the amount of ink ejected from the nozzle is designated. The waveform designation signal dCom is a digital signal for defining the waveform of the driving signal Com. The latch signal LAT and the change signal CNG are used in combination with the print data signal SI, and by defining the drive timing of the driving element, the ink ejection timing from the nozzle is defined. The clock signal CLK is a reference clock signal synchronized with the timing signal PTS.

The above control circuit 6c includes, for example, one or more processors such as a CPU. The control circuit 6c may include a programmable logic device such as an FPGA instead of the CPU or in addition to the CPU.

The driving signal generation circuit 6d is a circuit that generates the driving signal Com for driving each driving element included in the head 3a of the head unit 3. Specifically, the driving signal generation circuit 6d has, for example, a DA converter circuit and an amplifier circuit. In the driving signal generation circuit 6d, the DA converter circuit converts the waveform designation signal dCom from the control circuit 6c from a digital signal into an analog signal, and the amplifier circuit generates the driving signal Com by amplifying the analog signal using the power supply potential VHV from the power supply circuit 6b. Here, among the waveforms included in the driving signal Com, the signal of the waveform actually supplied to the driving element is a driving pulse PD. The driving pulse PD is supplied to the driving element from the driving signal generation circuit 6d via the switch circuit 3e of the head unit 3.

Here, the switch circuit 3e is a circuit including a switching element that switches whether to supply at least a part of the waveform included in the driving signal Com as the driving pulse PD based on the print data signal SI.

The computer 7 has a function of supplying information such as the path information Da to the controller 5 and a function of supplying information such as the print data Img to the control module 6. In addition to these functions, the computer 7 of the present embodiment has a function of controlling the drive of the energy emitting section 3c. The computer 7 is, for example, a desktop computer or a notebook computer in which a program that realizes these functions is installed.

1-3. Configuration of Head Unit

Figure 3:
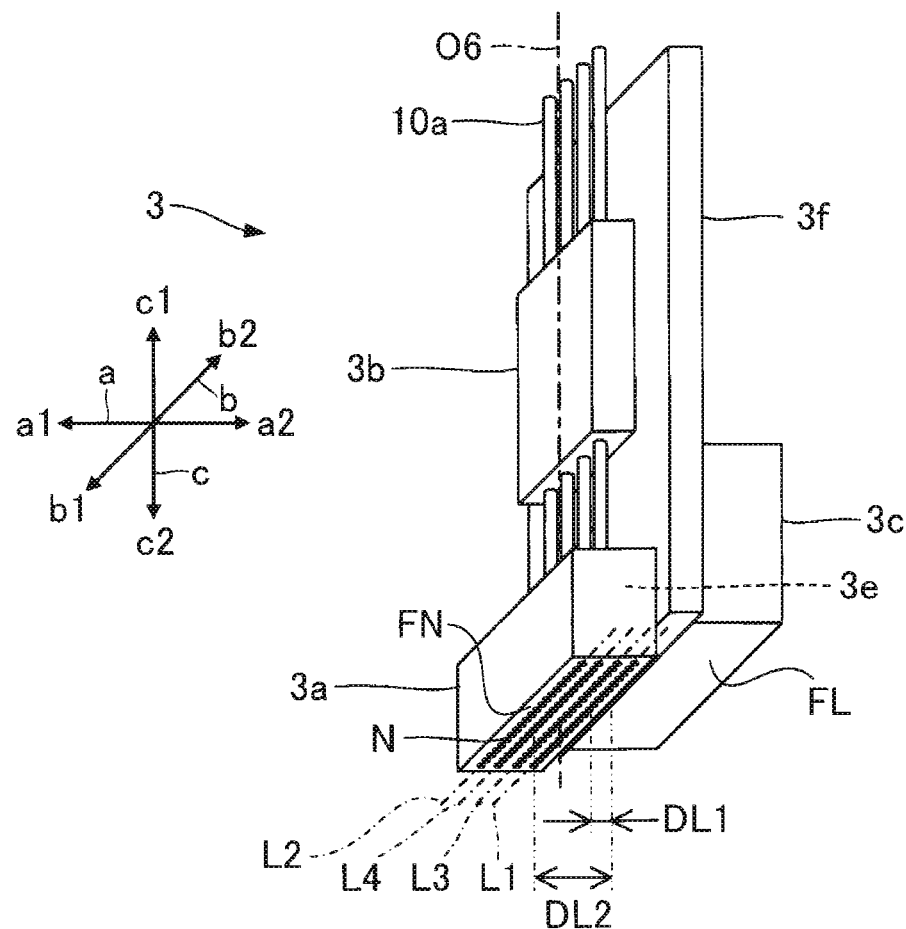
FIG. 3 is a perspective view illustrating a schematic configuration of a head unit used in the first embodiment.

FIG. 3 is a perspective view illustrating a schematic configuration of the head unit 3 used in the first embodiment. In the following description, for convenience, an a axis, a b axis, and a c axis that intersect each other are appropriately used. In addition, in the following, one direction along the a axis is an a1 direction, and the direction opposite to the a1 direction is an a2 direction. Similarly, the directions opposite to each other along the b axis are a b1 direction and a b2 direction. In addition, the directions opposite to each other along the c axis are a c1 direction and a c2 direction.

Here, the a axis, the b axis, and the c axis correspond to the coordinate axes of the tool coordinate system set in the head unit 3, and the relationship between the position and posture relative to the above-described world coordinate system or robot coordinate system changes by the operation of the above-described robot 2. In the example illustrated in FIG. 3, the c axis is an axis parallel to the above-described rotating axis O6. In addition, the a axis, the b axis, and the c axis are typically orthogonal to each other, but are not limited thereto, and may intersect each other at an angle within the range of 80° or more and 100° or less, for example. The tool coordinate system and the base coordinate system or the robot coordinate system are associated with each other by calibration. Further, the tool coordinate system is set so that, for example, the center of an ejection surface FN described later becomes a reference (TCP: tool center point).

As described above, the head unit 3 has the head 3a, the pressure adjusting valve 3b, and the energy emitting section 3c. These are supported by a support 3f illustrated by the alternate long and short dash line in FIG. 3. In the example illustrated in FIG. 3, the number of each of the head 3a and the pressure adjusting valve 3b included in the head unit 3 is one, but the number is not limited to the example illustrated in FIG. 3, and may be two or more. Further, the installation position of the pressure adjusting valve 3b is not limited to the head unit 3, and may be, for example, the arm 226 or the like, or may be a fixed position with respect to the base portion 210.

The support 3f is made of, for example, a metal material or the like, and is a substantially rigid body. In the example illustrated in FIG. 3, the support 3f has a flat plate shape extending in a direction orthogonal to the a axis. In the present embodiment, the head 3a is attached to the surface of the support 3f facing the a1 direction. On the other hand, the energy emitting section 3c is attached to the surface of the support 3f facing the a2 direction. The shape of the support 3f is not limited to the example illustrated in FIG. 3, and may be any shape, for example, a box shape or the like.

The above support 3f is mounted on the above-described arm 226. Therefore, the head 3a, the pressure adjusting valve 3b, and the energy emitting section 3c are collectively supported on the arm 226 by the support 3f. Therefore, the relative positions of each of the head 3a, the pressure adjusting valve 3b, and the energy emitting section 3c with respect to the arm 226 are fixed. In the example illustrated in FIG. 3, the pressure adjusting valve 3b is arranged at the position in the c1 direction with respect to the head 3a. The energy emitting section 3c is arranged at a position in the a2 direction with respect to the head 3a.

The head 3a has the ejection surface FN and a plurality of nozzles N that open to the ejection surface FN. The ejection surface FN is a nozzle surface through which the nozzle N opens, and is composed of, for example, a surface of a nozzle plate in which the nozzle N is provided as a through-hole in a plate-shaped member made of a material such as silicon (Si) or metal.

In the example illustrated in FIG. 3, the normal direction of the ejection surface FN is the c2 direction, and the plurality of nozzles N are classified into a first nozzle row L1, a second nozzle row L2, a third nozzle row L3, and a fourth nozzle row L4. These nozzle rows are arranged in the order of the first nozzle row L1, the third nozzle row L3, the fourth nozzle row L4, and the second nozzle row L2 in the a1 direction at intervals.

Each of the first nozzle row L1, the second nozzle row L2, the third nozzle row L3, and the fourth nozzle row L4 is a set of a plurality of nozzles N linearly arranged in the direction along the b axis. In the present embodiment, the nozzle density in the direction along the b axis of each nozzle N included in each nozzle row is 300 npi (number of nozzles/inch). However, the present disclosure is not limited thereto, and a lower nozzle density may be used, but a nozzle density of 25 npi or more is preferable from the viewpoint of print quality and efficiency. Further, in order to realize such a nozzle density, the nozzles N may be arranged in a staggered manner in each nozzle row. Here, the first nozzle row L1, the second nozzle row L2, the third nozzle row L3, and the fourth nozzle row L4 eject different types of ink from each other. Specifically, the first nozzle row L1 ejects the first ink. The second nozzle row L2 ejects the second ink. The third nozzle row L3 ejects the third ink. The fourth nozzle row L4 ejects the fourth ink. Since all the inks are ejected in the c2 direction under ideal conditions, the c2 direction can also be expressed as the ejection direction.

Although not illustrated, the head 3a has a piezoelectric element which is a driving element and a cavity for accommodating ink for each nozzle N. Here, the piezoelectric element ejects ink from the nozzle corresponding to the cavity by changing the pressure of the cavity corresponding to the piezoelectric element. The head 3a can be obtained, for example, by adhering a plurality of substrates such as a silicon substrate appropriately processed by etching or the like with an adhesive or the like. As the driving element for ejecting ink from the nozzle, a heater for heating the ink in the cavity may be used instead of the piezoelectric element. Since the head 3a has the above configuration, the presence or absence of ink ejection and the amount of ink ejection can be individually controlled for each nozzle N by the above-described control module 6, and it is possible to form an image with ink.

As described above, ink is supplied to the head 3a from an ink tank (not illustrated) via a supply pipe 10a. Here, a pressure adjusting valve 3b is interposed between the supply pipe 10a and the head 3a.

The pressure adjusting valve 3b is a valve mechanism that is opened and closed according to the pressure of the ink in the head 3a. By this opening and closing, the pressure of the ink in the head 3a is maintained at a negative pressure within a predetermined range even when the positional relationship between the head 3a and the ink tank (not illustrated above) changes. Therefore, the meniscus of the ink formed on the nozzle N of the head 3a is stabilized. As a result, it is possible to prevent air bubbles from entering the nozzle N and ink from overflowing from the nozzle N. Further, the ink from the pressure adjusting valve 3b is appropriately distributed to a plurality of locations of the head 3a via a branch flow path (not illustrated). Here, the ink from the ink tank (not illustrated) is transferred in the supply pipe 10a at a predetermined pressure by using a pump, a water head difference, or the like. Although not illustrated, the pressure adjusting valve 3b has a configuration for ink flow path and pressure adjustment for each type of ink so that the pressure of each of the above-described four types of ink can be adjusted individually.

The energy emitting section 3c emits energy such as light, heat, electron beam, or radiation for curing or solidifying the ink on the workpiece W. For example, when the ink has ultraviolet curability, the energy emitting section 3c is composed of a light emitting element such as a light emitting diode (LED) that emits ultraviolet rays. Further, the energy emitting section 3c may appropriately have an optical component such as a lens for adjusting the energy emitting direction or the energy emitting range.

Here, the energy emitting section 3c includes an emitting surface FL that emits the energy, and is arranged so that the emitting surface FL faces the c2 direction. Further, as described above, since the energy emitting section 3c is arranged at the position in the a2 direction with respect to the head 3a, a distance DL2 between the second nozzle row L2 and the emitting surface FL is greater than a distance DL1 between the first nozzle row L1 and the emitting surface FL.

The energy emitting section 3c does not have to completely cure or completely solidify the ink on the workpiece W. In this case, for example, the ink after the energy irradiation from the energy emitting section 3c may be completely cured or completely solidified by the energy from the curing light source separately installed on the installation surface of the base portion 210 of the robot 2.

1-4. Printing Operation of Printing Apparatus

Figure 4:
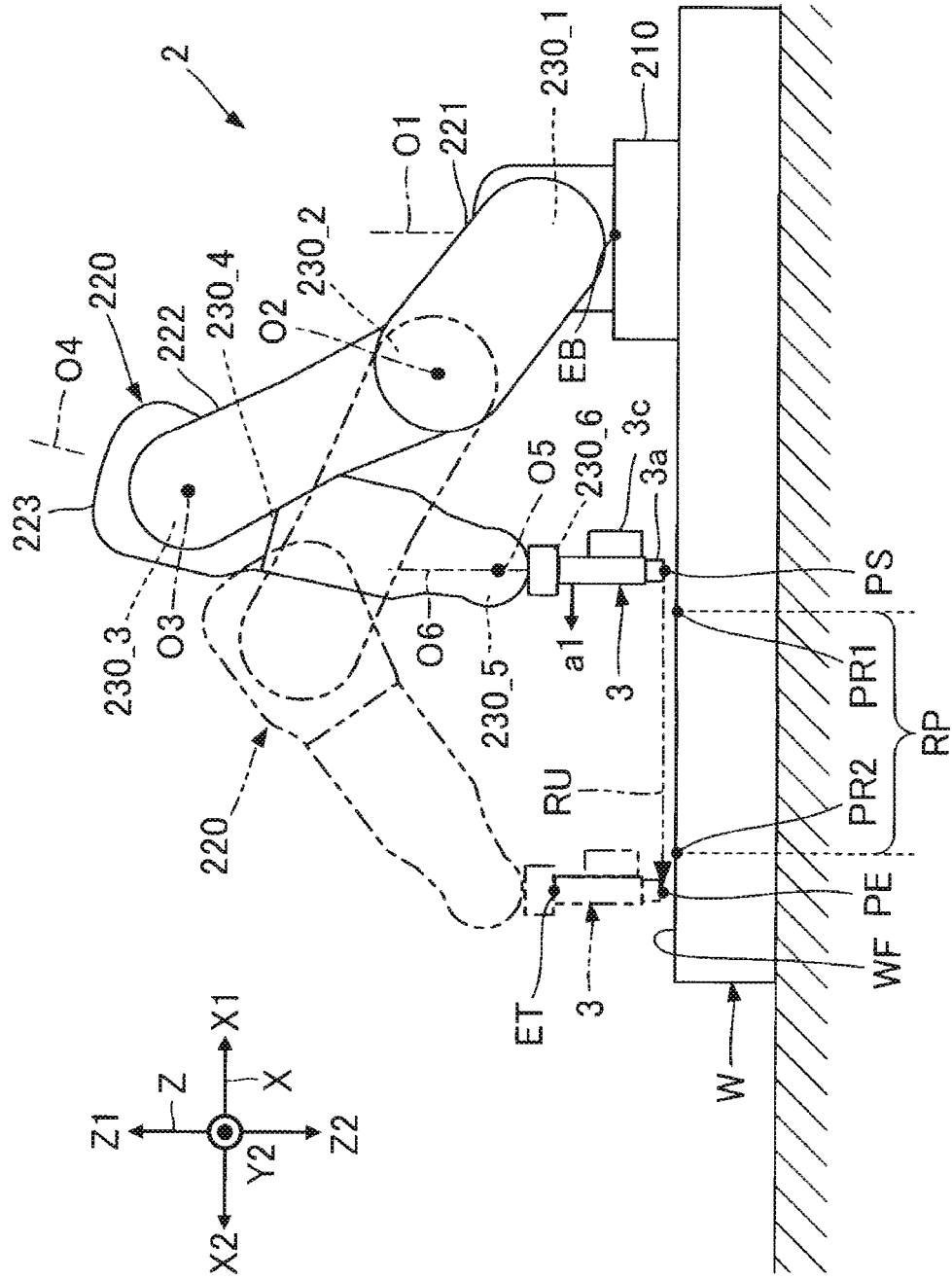
FIG. 4 is a view for describing a printing operation of the printing apparatus according to the first embodiment.

FIG. 4 is a view for describing a printing operation of the printing apparatus 1 according to the first embodiment. FIG. 4 illustrates a case where printing is performed on a predetermined region RP of the surface WF of the workpiece W placed at a position in the Y2 direction from the base portion 210 of the robot 2 when viewed in the direction along the Z axis. The predetermined region RP is provided at a position in the X2 direction with respect to the base portion 210 of the robot 2 when viewed in the direction along the Y axis.

In the printing operation, the head 3a ejects ink while the robot 2 changes the position and posture of the head 3a. The change in the position and posture of the head 3a is performed based on the path information Da. As a result, the head 3a moves along a moving path RU while maintaining a predetermined posture with respect to the surface WF. The head 3a may be moved a plurality of times along the moving path RU for each ink ejection of each color, or all the inks may be ejected in parallel during one movement of the head 3a along the moving path RU.

The moving path RU is a path from a position PS to a position PE. The position PS is a position in the X1 direction with respect to the predetermined region RP when viewed in the Z2 direction. The position PE is a position in the X2 direction with respect to the predetermined region RP when viewed in the Z2 direction. In the period until the head 3a reaches the predetermined region RP from the position PS, the head 3a accelerates until the predetermined speed is reached. In the period during which the head 3a is positioned in the predetermined region RP, the head 3a moves at a constant speed at the predetermined speed. In the period during which the head 3a reaches the position PE from the predetermined region RP, the head 3a is decelerated so as to be able to stop at the position PE. Here, the predetermined region RP is a region extending from a position PR1 to a position PR2 along the moving path RU.

In the example illustrated in FIG. 4, the moving path RU has a linear shape when viewed in the Z2 direction. In the present embodiment, the robot 2 moves the head 3a linearly along the moving path RU by operating four or more joints 230 including the joints 230_2, 230_3, and 230_5 among the six joints 230 while the printing operation is being executed. Further, the robot 2 moves the head 3a in a direction away from the base portion 210. Here, the above-described a1 direction faces forward in the moving direction of the head 3a. Therefore, the energy emitting section 3c is positioned behind the head 3a in the moving direction of the head 3a. Therefore, the ink immediately after landing on the surface WF from the head 3a can be irradiated with the energy from the energy emitting section 3c.

The workpiece W may be placed at a position in the X2 direction with respect to the base portion 210 of the robot 2 so that the position in the direction along the Y axis coincides with the position of the base portion 210. In this case, the moving path RU forms a straight line along the X axis when viewed in the Z2 direction. Further, in this case, the robot 2 performs the printing operation by operating three joints 230 among the six joints 230 while the printing operation is being executed. More specifically, the robot 2 keeps the rotating axes of the joint 230_2, the joint 230_3, and the joint 230_5 parallel to the Y axis while the printing operation is being executed, and operates the joints 230. By such an operation of the three joints 230, the head 3a can be stably moved along the moving path RU.

Further, since the above-described a1 direction faces the front in the moving direction of the head 3a while the printing operation is being executed, the above-described first nozzle row L1, the third nozzle row L3, the fourth nozzle row L4, and the second nozzle row L2 are arranged in this order from the near side to the far side with respect to the base portion 210. Therefore, when the first ink, the second ink, the third ink, and the fourth ink are ejected to the same position on the surface WF, the postures of the robot 2 at the ejection timing of each ink are different from each other.

Here, regarding the timing of ejecting the first ink, the second ink, the third ink, and the fourth ink at the same position on the surface WF, the ejection timing of the first ink is the "first timing", the ejection timing of the second ink is the "second timing", the ejection timing of the third ink is the "third timing", and the ejection timing of the fourth ink is the "fourth timing". Hereinafter, the first timing and the second timing will be typically described.

Figure 5:
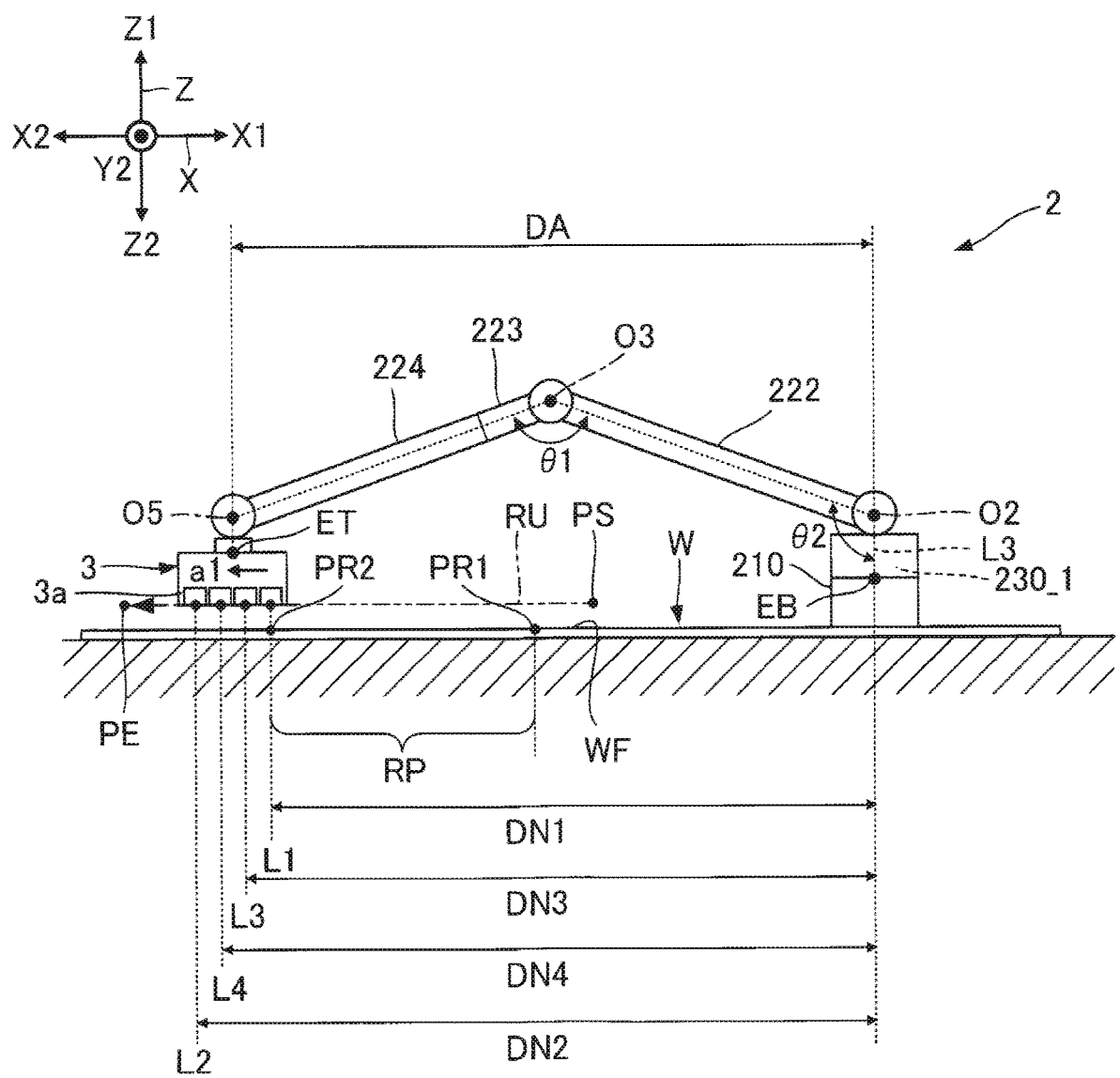
FIG. 5 is a view illustrating a state of a robot at a first timing.
Figure 6:
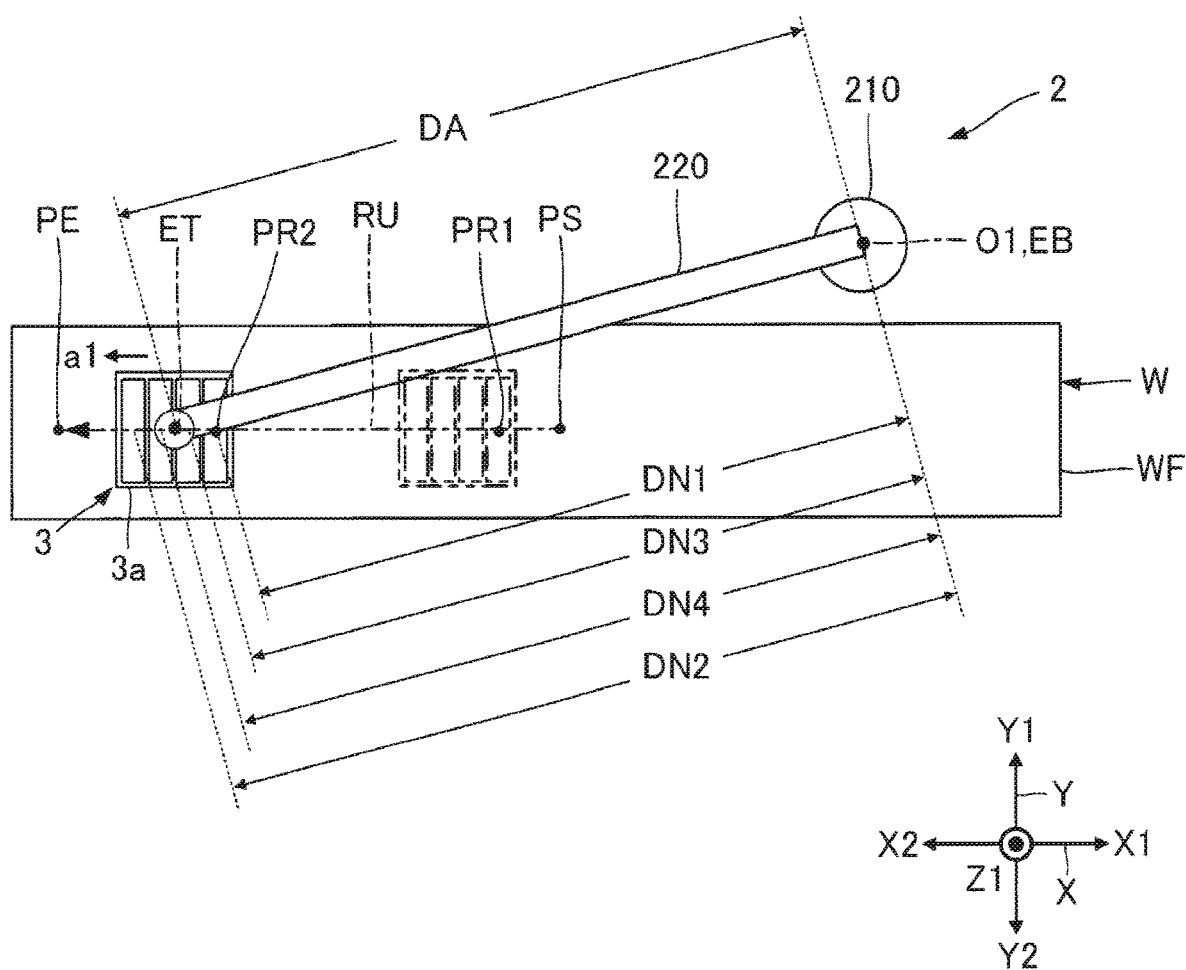
FIG. 6 is a view for describing a distance between a distal end and a proximal end of an arm portion of the robot at the first timing.

FIG. 5 is a view illustrating a state of the robot 2 at the first timing. FIG. 6 is a view for describing the distance DA between the distal end ET and the proximal end EB of the arm portion 220 of the robot 2 at the first timing. In FIGS. 5 and 6, a state where the timing at which the first nozzle row L1 ejects the first ink to the position PR2 is set as the first timing is exemplified. Note that, in FIGS. 5 and 6, for convenience of description, each section of the robot 2 and the head unit 3 is schematically illustrated.

As illustrated in FIGS. 5 and 6, at the first timing, the first nozzle row L1, the third nozzle row L3, the fourth nozzle row L4, and the second nozzle row L2 are arranged in this order from the near side to the far side with respect to the base portion 210. Therefore, the distances between these nozzle rows and the proximal end EB are, from the short distance to the long distance, in the order of a distance DN1 between the first nozzle row L1 and the proximal end EB, a distance DN3 between the third nozzle row L3 and the proximal end EB, a distance DN4 between the fourth nozzle row L4 and the proximal end EB, and a distance DN2 between the second nozzle row L2 and the proximal end EB. In addition, in the present embodiment, the distance DN1 is the shortest distance in the horizontal direction between the center of the first nozzle row L1 and the center of the proximal end EB. Similarly, each of the distances DN2, DN3, and DN4 is the shortest distance in the horizontal direction between the center of the corresponding nozzle row and the center of the proximal end EB. However, the distances DN1, DN2, DN3, and DN4 may be simply linear distances between the center of each nozzle row and the center of the proximal end EB without considering the direction.

It is preferable that such an arrangement order of the nozzle rows be maintained while the printing operation is being executed for the predetermined region RP.

In the present embodiment, since the head 3a moves in the direction away from the base portion 210, an angle θ1 formed by the extending direction of the arm 224 and the extending direction of the arm 222 becomes large with the movement of the head 3a during the printing operation. On the other hand, an angle θ2 formed by the extending direction of the arm 222 and the rotating axis O1 becomes less as the head 3a moves during the printing operation.

Figure 7:
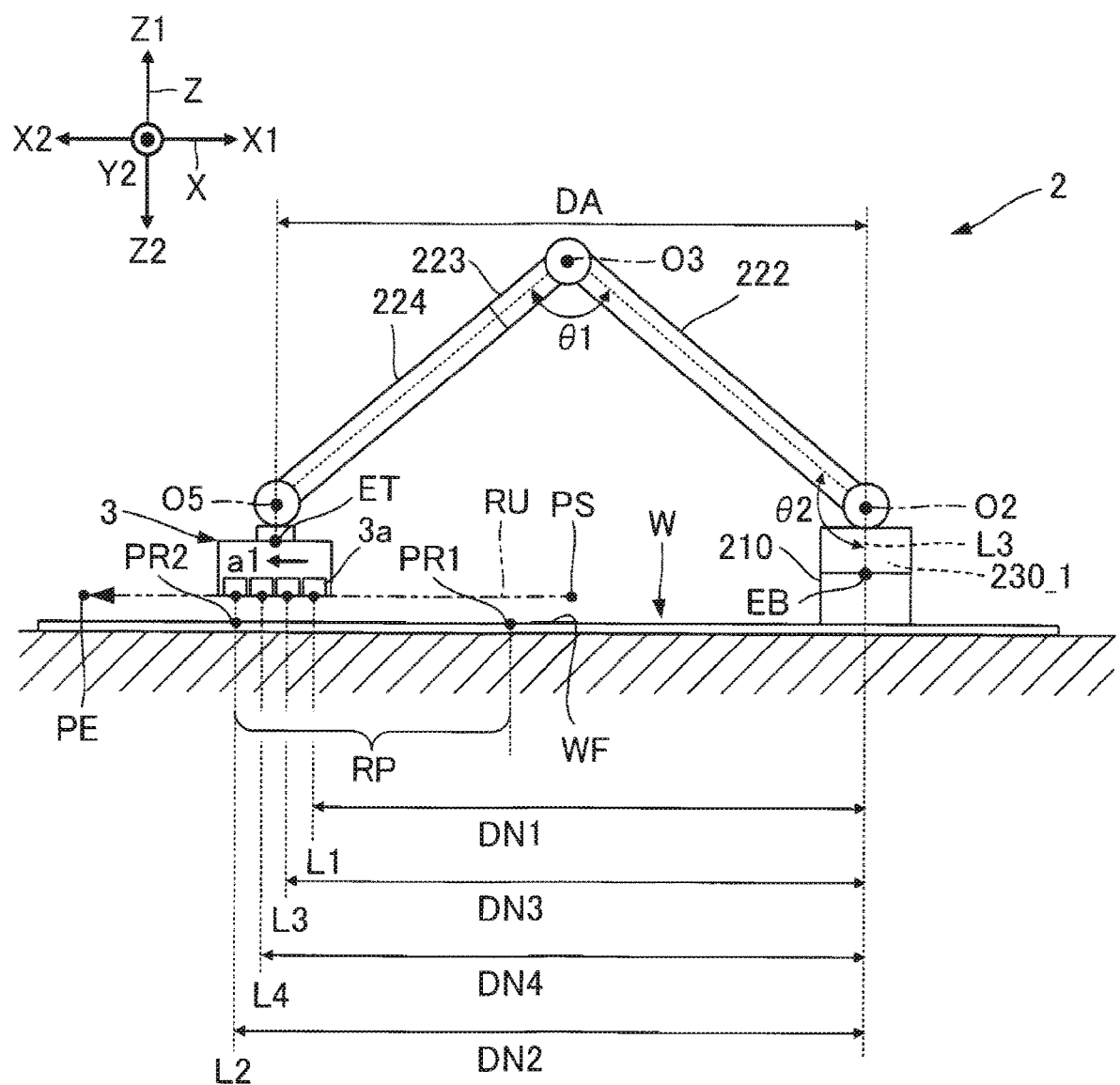
FIG. 7 is a view illustrating a state of a robot at a second timing.
Figure 8:
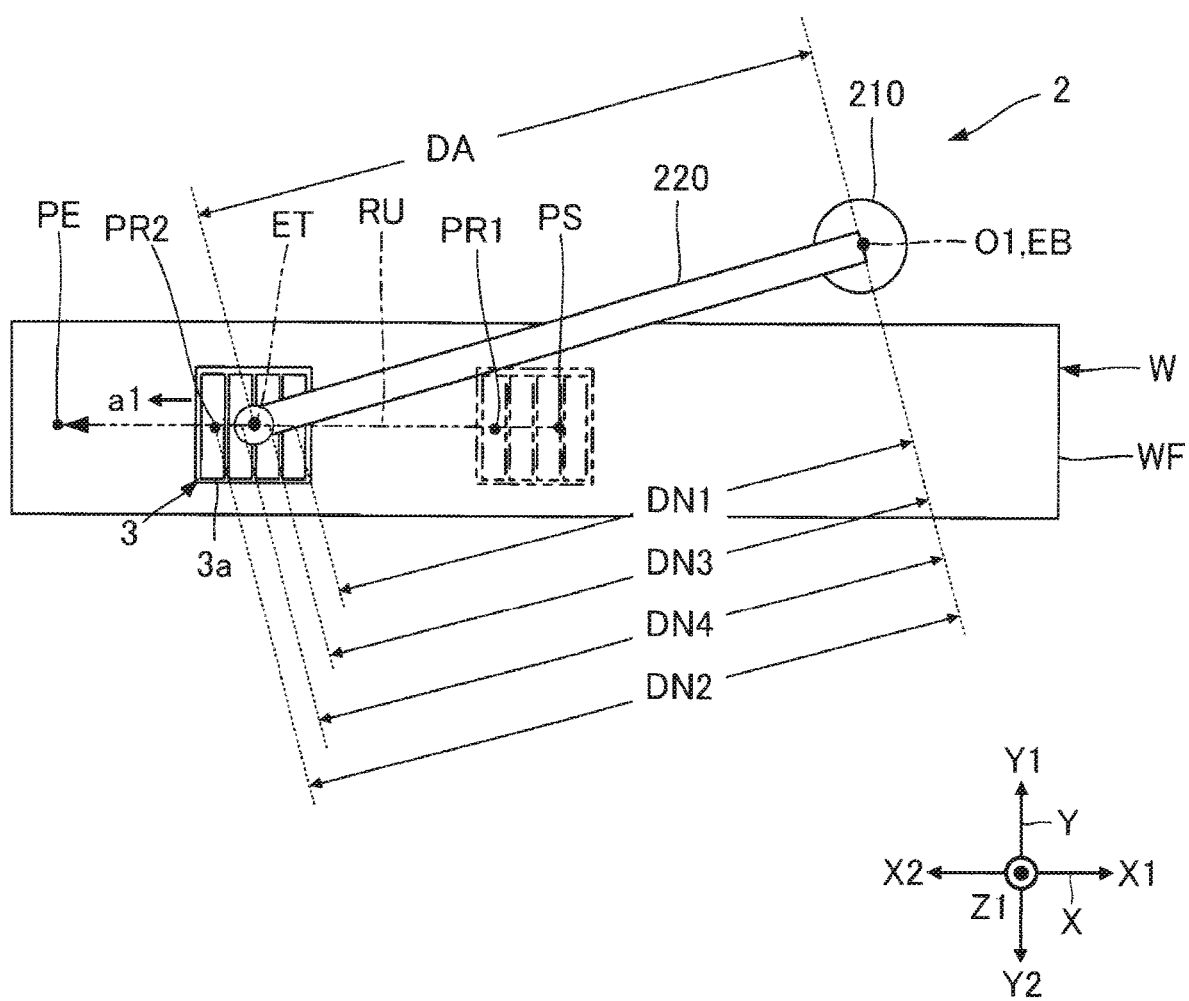
FIG. 8 is a view for describing a distance between a distal end and a proximal end of an arm portion of the robot at the second timing.

FIG. 7 is a view illustrating a state of the robot 2 at the second timing. FIG. 8 is a view for describing the distance between the distal end ET and the proximal end EB of the arm portion 220 of the robot 2 at the second timing. In FIGS. 7 and 8, a state where the timing at which the second nozzle row L2 ejects the second ink to the position PR2 is set as the second timing is exemplified. Note that, in FIGS. 7 and 8, for convenience of description, each section of the robot 2 and the head unit 3 is schematically illustrated.

As illustrated in FIGS. 7 and 8, at the second timing, similar to the first timing, the first nozzle row L1, the third nozzle row L3, the fourth nozzle row L4, and the second nozzle row L2 are arranged in this order from the near side to the far side with respect to the base portion 210. Therefore, the distances between these nozzle rows and the proximal end EB are, from the short distance to the long distance, in the order of a distance DN1 between the first nozzle row L1 and the proximal end EB, a distance DN3 between the third nozzle row L3 and the proximal end EB, a distance DN4 between the fourth nozzle row L4 and the proximal end EB, and a distance DN2 between the second nozzle row L2 and the proximal end EB.

However, the distance DN1 at the second timing is less than the distance DN1 at the first timing. The difference between these distances DN1 is large according to the distance between the first nozzle row L1 and the second nozzle row L2. Similarly, the distance DN2 at the second timing is less than the distance DN2 at the first timing. The distance DN3 at the second timing is less than the distance DN3 at the first timing. The distance DN4 at the second timing is less than the distance DN4 at the first timing.

Due to the magnitude relationship between the distances DN1, DN2, DN3, and DN4 at the second timing and the distances DN1, DN2, DN3, and DN4 at the first timing, the distance DA between the distal end ET and the proximal end EB of the arm portion 220 at the second timing is less than the distance DA at the first timing.

Here, the arm portion 220 at the second timing is in a contracted state as compared with the arm portion 220 at the first timing. Therefore, the angle θ1 at the second timing is less than the angle θ1 at the first timing. Further, the angle θ2 at the second timing is greater than the angle θ2 at the first timing.

Figure 9:
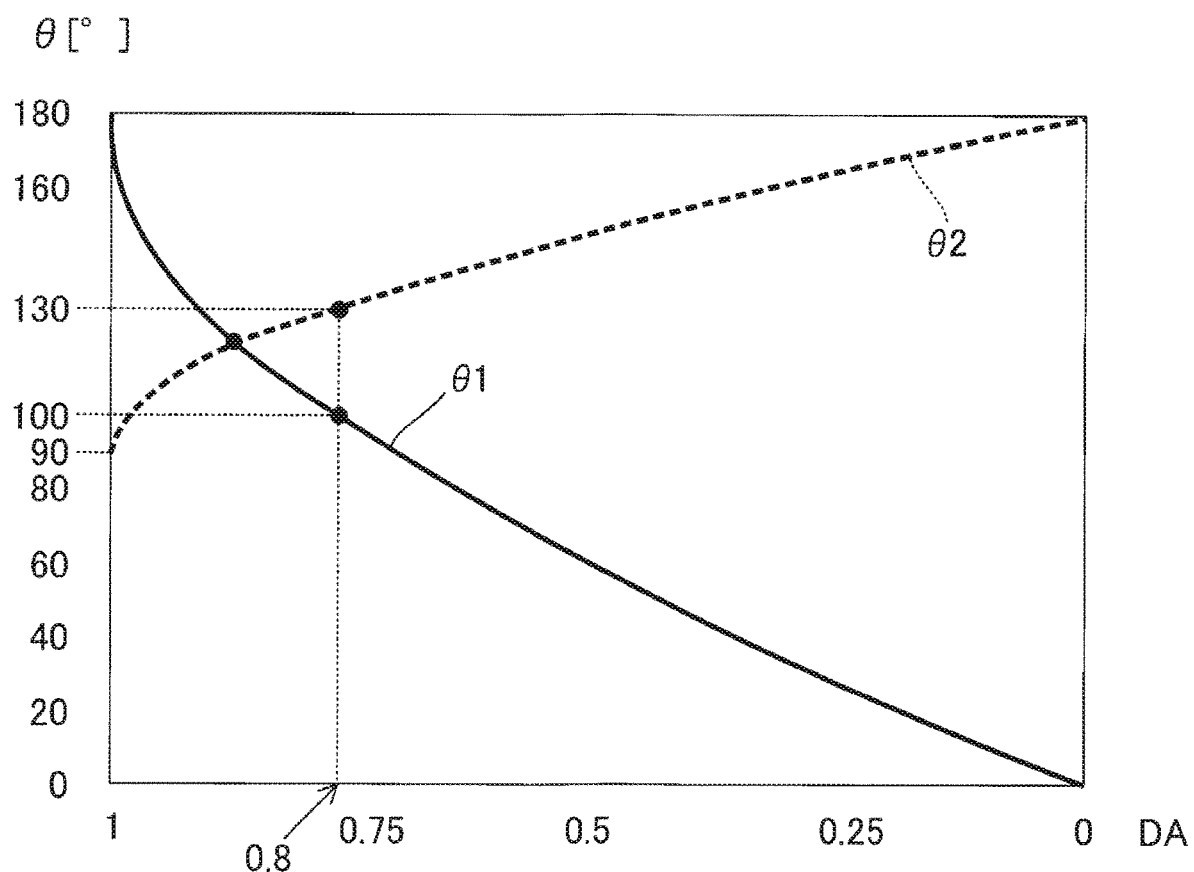
FIG. 9 is a graph illustrating a relationship between the distance between the distal end and the proximal end of the arm portion and a rotation angle of the joint of the robot.

FIG. 9 is a graph illustrating the relationship between the distance DA between the distal end ET and the proximal end EB of the arm portion 220 and the rotating angle θ of the joint 230 of the robot 2. The rotating angle θ in FIG. 9 is the above-described angle θ1 or angle θ2. FIG. 9 illustrates the relationship between the distance DA and the rotating angle θ when the rotating axis O2, the rotating axis O3, and the rotating axis O5 are maintained parallel to each other, the rotating axis O1 and the rotating axis O6 are maintained parallel to the Z axis, and these joints 230 are operated. Here, a case where the distance between the rotating axis O3 and the distal end ET is equal to the distance between the rotating axis O3 and the proximal end EB is exemplified, and regarding the distance DA in FIG. 9, the distance DA in a state where the arm portion 220 is most contracted is 0, and the distance DA in a state where the arm portion 220 is most stretched is 1. In addition, in FIG. 9, for the sake of simplicity, the limit of the range of motion of the joint 230 is not taken into consideration.

The joint 230 can be a source of vibration for the arm portion 220. Here, in general, the vibration of the joint 230 is more likely to occur when the rotating speed changes (increases or decreases) as compared with a case where the rotating operation is stopped or the rotating speed is constant. Further, once the vibration of the joint 230 is generated, it is difficult to suppress the vibration. The vibration generated at the joint 230 propagates to the head 3a via the arm portion 220. As a result, the head 3a vibrates. When the head 3a vibrates, the actual moving path of the head 3a is shifted from the ideal moving path, which causes deterioration of print quality.

As illustrated in FIG. 9, as the distance DA increases, the greater the angle θ1 increases. On the other hand, as the distance DA increases, the angle θ2 decreases. Here, the respective change amounts in the angle θ1 and the angle θ2 per unit length of the distance DA are generally substantially constant when the distance DA is in the range of 0 or more and 0.8 or less, but when the distance DA exceeds 0.8, the change amount increases as the distance DA increases.

Therefore, the continuous movement is performed from the state where the distance DA is relatively small and the arm portion 220 is contracted to the state where the distance DA is relatively large and the arm portion 220 is stretched, and the distance DA changes at a constant speed. In this case, initially, the rotating speed of the joint 230 is almost constant, but as the arm portion 220 approaches the stretched state, the change in the rotation speed of the joint 230 increases. Therefore, in the state where the distance DA is relatively large and the arm portion 220 is stretched, the vibration of the joint 230 is more likely to occur as compared to the state where the distance DA is relatively small and the arm portion 220 is contracted. Therefore, at the second timing when the distance DA is small, the vibration of the head 3a is more likely to be suppressed as compared with the first timing.

Here, in the period during which the head 3a scans on the predetermined region RP along the moving path RU, the period during which the head 3a ejects the first ink from the first nozzle row L1 to the predetermined region RP is defined as the first period. Here, in the period during which the head 3a scans on the predetermined region RP along the moving path RU, the period during which the head 3a ejects the second ink from the second nozzle row L2 to the predetermined region RP is defined as the second period. Here, the first period and the second period may partially overlap. The first period includes the first timing, and the second period includes the second timing. Here, as described above, the distance DA at the second timing is less than the distance DA at the first timing, and as can be understood from the graph of FIG. 9, in the first period and the second period, when the ink is ejected onto the same predetermined region RP, the total rotating amount of the plurality of joints 230 in the second period is less than the total rotating amount of the plurality of joints 230 in the first period. In addition, the first period and the second period may or may not overlap each other. That is, the ejection of the first ink from the first nozzle row and the ejection of the second ink from the second nozzle row may be executed simultaneously in one scan of the head 3a, and may be executed by dividing the ejection into the ejection of the first ink from the first nozzle row in the first scan of the head 3a and the ejection of the second ink from the second nozzle row in the second scan of the head 3a.

As described above, the printing apparatus 1 includes the head 3a and the robot 2 that changes the position and posture of the head 3a with respect to the workpiece W. Here, the head 3a includes the first nozzle row L1 in which the plurality of nozzles N for ejecting the first ink are arranged, and the second nozzle row L2 in which the plurality of nozzles N for ejecting the second ink are arranged. The robot 2 has the arm portion 220 having the distal end ET, the proximal end EB, and the plurality of joints 230, and the base portion 210 coupled to the proximal end EB, and the head 3a is supported by the distal end ET. The brightness of the second ink is lower than the brightness of the first ink. Then, when the timing of ejecting the first ink from the first nozzle row L1 to the predetermined position PR2 on the workpiece W is set as the first timing, and the timing of ejecting the second ink from the second nozzle row L2 to the predetermined position PR2 is set as the second timing, the distance DA between the distal end ET and the proximal end EB at the second timing is less than the distance DA between the distal end ET and the proximal end EB at the first timing.

In the above printing apparatus 1, since the brightness of the second ink is lower than the brightness of the first ink, the landing error of the second ink on the workpiece W tends to be more conspicuous than the landing error of the first ink on the workpiece W. That is, the second ink is more likely to cause a deterioration in print quality due to the landing error on the workpiece W compared to the first ink. Therefore, in order to improve the print quality, the distance DA at the second timing is less than the distance DA at the first timing.

More specifically, by making the distance DA at the second timing shorter than the distance DA at the first timing, the moment centered on the proximal end EB of the arm portion 220 at the second timing can be made less than the moment centered on the proximal end EB of the arm portion 220 at the first timing. Therefore, at the second timing, vibration is less likely to occur at the distal end ET of the arm portion 220 and thus in the head 3a as compared with the first timing. As a result, at the second timing, the landing error of the second ink on the workpiece W can be reduced as compared with the first timing.

Further, as the distance DA increases, the rotating amount of the joint 230 per unit moving distance of the head 3a tends to increase. Therefore, as the distance DA increases, the vibration of the head 3a is likely to occur accompanying the driving of the joint 230. Therefore, making the distance DA at the second timing shorter than the distance DA at the first timing also has an effect of reducing the vibration of the head 3a accompanying the driving of the joint 230.

On the other hand, at the first timing, vibration of the head 3a is more likely to occur than at the second timing, but the first ink in which the landing error is less conspicuous than that of the second ink is used.

As described above, of the first ink and the second ink having different brightness, by increasing the landing accuracy of the second ink in which the landing error is conspicuous compared to the landing accuracy of the first ink in which the landing error is inconspicuous, as a whole, it is possible to reduce the deterioration of the print quality due to the landing error of the ink on the workpiece W. Therefore, the print quality can be improved as compared with the configuration in which the distance DA at the second timing is equal to or greater than the distance DA at the first timing.

Further, as described above, in each of the first timing and the second timing, the distance DN2 between the second nozzle row L2 and the proximal end EB is greater than the distance DN1 between the first nozzle row L1 and the proximal end EB. Therefore, the distance DA at the second timing can be made shorter than the distance DA at the first timing. By making the distance DN2 longer than the distance DN1 regardless of the first timing and the second timing, the distance DA at the time of printing by the second nozzle row L2 can be changed to be shorter than the distance DA at the time of printing by the first nozzle row L1.

Furthermore, as described above, a state where the distance DN2 between the second nozzle row L2 and the proximal end EB is greater than the distance DN1 between the first nozzle row L1 and the proximal end EB is maintained in both periods, a period during which the robot 2 ejects the first ink from the first nozzle row L1 while scanning the predetermined region RP including the predetermined position PR2 on the workpiece W with the head 3a, and a period during which the robot 2 ejects the second ink from the second nozzle row L2 while scanning the predetermined region RP with the head 3a. Therefore, the distance DA at the second timing can be shorter than the distance DA at the first timing over the entire printing period.

Further, as described above, the head 3a further includes a third nozzle row L3 in which a plurality of nozzles N for ejecting the third ink are arranged. The brightness of the third ink is lower than the brightness of the first ink and higher than the brightness of the second ink. In addition, at each of the first timing and the second timing, the distance DN3 between the third nozzle row L3 and the proximal end EB is greater than the distance DN1 between the first nozzle row L1 and the proximal end EB, and is less than the distance DN2 between the second nozzle row L2 and the proximal end EB. Therefore, even when the third ink is used in addition to the first ink and the second ink, it is possible to reduce the deterioration of the print quality due to the landing error of the ink on the workpiece W.

In the present embodiment, as described above, the head 3a includes the first nozzle row L1, the second nozzle row L2, the third nozzle row L3, and the fourth nozzle row L4 as a plurality of nozzle rows for ejecting ink. Here, in any two nozzle rows selected from the plurality of nozzle rows, the brightness of the ink ejected from the nozzle row having farther distance from the proximal end EB is lower than the brightness of the ink ejected from the nozzle row having a closer distance to the proximal end EB. That is, the plurality of nozzle rows are arranged so that the greater the distance from the proximal end EB, the lower the brightness of the ink ejected from the nozzle rows. Therefore, when a plurality of types of inks are used, it is possible to preferably reduce the deterioration of the print quality due to the landing error of the inks on the workpiece W.

Further, as described above, the printing apparatus 1 further includes the energy emitting section 3c. The energy emitting section 3c includes the emitting surface FL that is supported by the distal end ET and emits energy that cures each of the first ink and the second ink.

Moreover, the distance DL2 between the second nozzle row L2 and the emitting surface FL is greater than the distance DL1 between the first nozzle row L1 and the emitting surface FL. Therefore, the amount of the second ink adhering to the emitting surface FL can be reduced as compared with the amount of the first ink. Here, since the brightness of the second ink is lower than the brightness of the first ink, the second ink is more likely to absorb energy from the emitting surface FL than the first ink. Therefore, an effect is achieved in which reducing the amount of the second ink adhering to the emitting surface FL can suppress a decrease in the irradiation efficiency of energy from the emitting surface FL to each ink, and the frequency of maintenance such as cleaning of the emitting surface FL can be reduced. Since the first ink is less likely to absorb energy from the emitting surface FL than the second ink, even when the amount of the first ink adhering to the emitting surface FL increases, compared to a case where the second ink adheres to the emitting surface FL, the problem that irradiation efficiency of energy from the emitting surface FL to each ink decreases or the frequency of maintenance such as cleaning of the emitting surface FL increases is unlikely to occur.

Further, as described above, each of the first period and the second period is defined for the period in which the head 3a scans along the predetermined region RP including the predetermined position PR2 on the workpiece W. The first period is a period during which the first ink is ejected from the first nozzle row L1 to the predetermined region RP. The second period is a period in which the second ink is ejected from the second nozzle row L2 to the predetermined region RP. Moreover, the total rotating amount of the plurality of joints 230 in the second period is less than the total rotating amount of the plurality of joints 230 in the first period. Therefore, the vibration of the head 3a in the second period can be made less than the vibration of the head 3a in the first period.

Furthermore, as described above, the first ink is the ink having the highest brightness among the inks ejected from the head 3a. Therefore, the print quality can be preferably improved.

In the present embodiment, as described above, the first ink is yellow ink. Generally, among the plurality of colors of ink used for full-color printing and the like, the ink having the highest brightness is yellow ink. Therefore, by using the yellow ink as the first ink, the print quality such as full-color printing can be preferably improved. In a configuration using five or more types of ink, white ink may be used as the ink having the highest brightness. In this case, the first ink may be white ink.

Furthermore, as described above, the second ink is the ink having the lowest brightness among the inks ejected from the head 3a. In this case, the print quality can be preferably improved.

In the present embodiment, as described above, the second ink is black ink. Generally, among the plurality of colors of ink used for full-color printing and the like, the ink having the lowest brightness is black ink. Therefore, by using the black ink as the second ink, the print quality such as full-color printing can be preferably improved.

Furthermore, as described above, the head 3a includes the first nozzle row L1, the second nozzle row L2, the third nozzle row L3, and the fourth nozzle row L4 as a plurality of nozzle rows for ejecting ink. Here, the first nozzle row L1 and the second nozzle row L2 are preferably two nozzle rows arranged farthest from each other among the plurality of nozzle rows. In this case, the print quality can be improved as compared with the configuration in which the other nozzle rows are the first nozzle row L1 and the second nozzle row L2.

2. SECOND EMBODIMENT

Hereinafter, a second embodiment of the present disclosure will be described. In the embodiment illustrated below, elements having the same effects and functions as those of the first embodiment will be given the reference numerals used in the description of the first embodiment, and each of the detailed descriptions thereof will be appropriately omitted.

Figure 10:
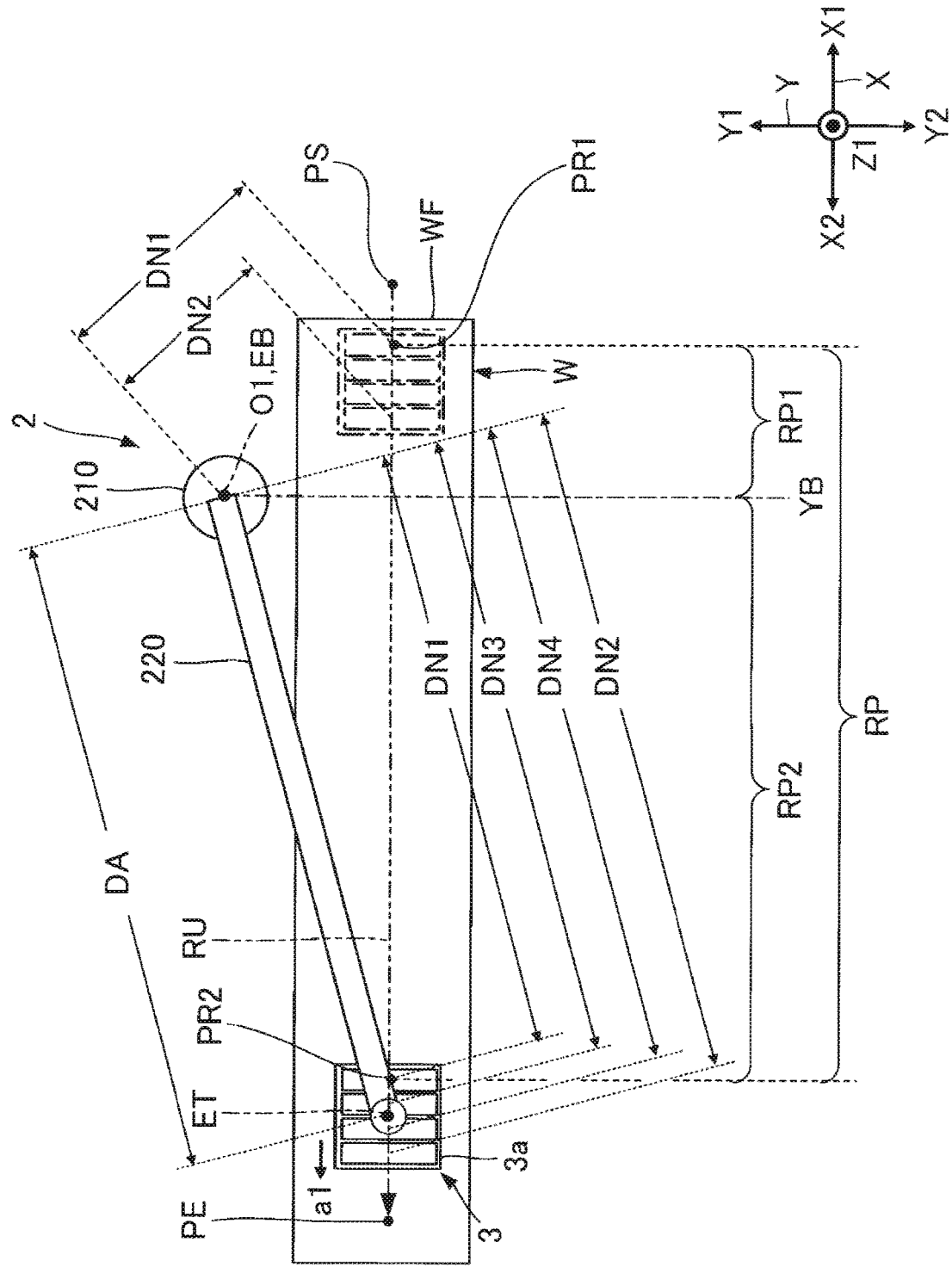
FIG. 10 is a view for describing a printing operation according to a second embodiment.

FIG. 10 is a view for describing a printing operation according to a second embodiment. The present embodiment is the same as the above-described first embodiment except that the predetermined region RP is different. In the first embodiment, an embodiment in which the magnitude relationship of the distances DN1 to DN4 between each nozzle row and the proximal end EB does not change while the printing operation is being executed is exemplified, but the magnitude relationship may change.

In the present embodiment, a printing region PR is expanded in the X1 direction as compared with the first embodiment. Here, the predetermined region RP is classified into a region RP1 and a region RP2 by a virtual straight line YB that passes through the proximal end EB and is orthogonal to the scanning direction of the head 3a along the moving path RU when viewed in the direction along the Z axis.

In the example illustrated in FIG. 10, since the moving path RU is parallel to the X axis when viewed in the direction along the Z axis, the straight line YB is parallel to the Y axis. The region RP1 is positioned in the X1 direction with respect to the straight line YB when viewed in the direction along the Z axis. On the other hand, the region RP2 is positioned in the X2 direction with respect to the straight line YB when viewed in the direction along the Z axis.

When printing is performed during the period in which the head 3a is moved from the position PS to the position PE in the X2 direction along the moving path RU with respect to the predetermined region RP, the ejection of ink from the first nozzle row L1 is started at the position PR1 in the region RP1 and stopped at the position PR2 in the region RP2. Here, the arrangement order of the nozzle rows in the direction along the X axis is maintained over the entire printing period. Therefore, the magnitude relationship of the distances DN1 to DN4 changes in the middle of the printing period.

More specifically, in a state where the distal end ET is positioned in the region RP2, similar to the first embodiment, the magnitude relationship of the distance between each nozzle row and the proximal end EB is a relationship satisfying DN2>DN1. On the other hand, in a state where the distal end ET is positioned in the region RP1, the magnitude relationship of the distance between each nozzle row and the proximal end EB is a relationship satisfying DN2<DN1. In this manner, when the distal end ET passes on the straight line YB, the magnitude relationship of the distances DN1 to DN4 changes in the middle of the printing period.

From the viewpoint of improving the print quality, it is not preferable to perform printing in a state where DN2<DN1. Therefore, it is preferable that the predetermined region RP does not have the region RP1 having a relationship of DN2<DN1. Alternatively, it is preferable to control the operation of the robot 2 so that the relationship of DN1>DN2 is satisfied even when the predetermined region RP includes the region RP1.

However, printing may be performed in a state where DN2<DN1. That is, printing may be permitted in a state where DN2<DN1. Here, when the predetermined region RP includes the region RP1, it is preferable that the length of the region RP1 along the moving path RU be shorter than the length of the region RP2 along the moving path RU from the viewpoint of the balance between print quality and productivity. More preferably, the length of the region RP1 along the moving path RU is equal to or less than ½ with respect to the length of the region RP2 along the moving path RU. As described above, when the length of the region RP1 along the moving path RU is short to some extent, even when there is a period during which printing is performed in the state of DN2<DN1, there is a period during which printing is performed in the state where DN2>DN1, and accordingly, printing with an excellent balance between print quality and productivity can be performed.

3. THIRD EMBODIMENT

Hereinafter, a third embodiment of the present disclosure will be described. In the embodiment illustrated below, elements having the same effects and functions as those of the first embodiment will be given the reference numerals used in the description of the first embodiment, and each of the detailed descriptions thereof will be appropriately omitted.

Figure 11:
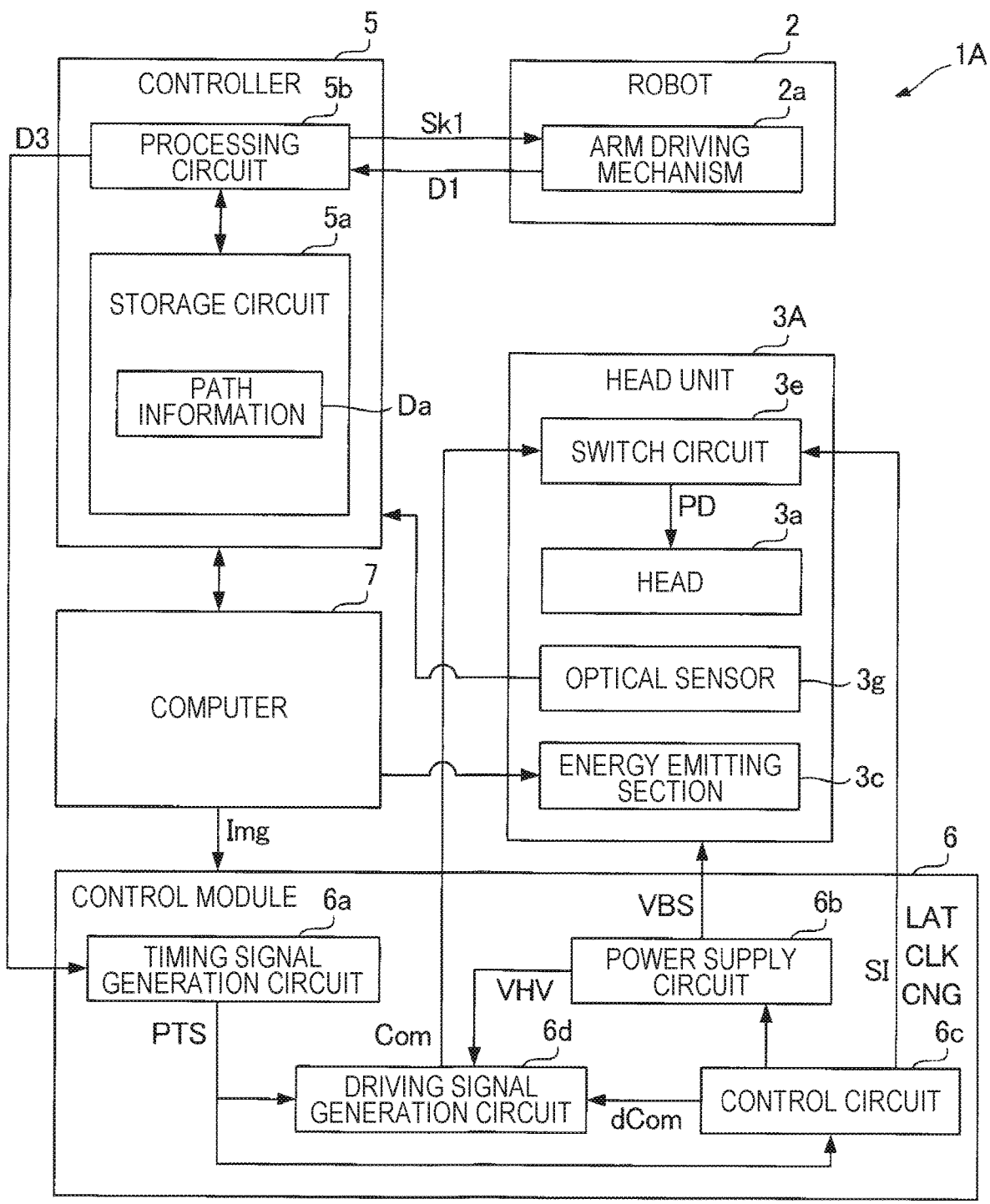
FIG. 11 is a block diagram illustrating an electric configuration of a printing apparatus according to a third embodiment.

FIG. 11 is a block diagram illustrating an electric configuration of a printing apparatus 1A according to the third embodiment. The printing apparatus 1A is configured in the same manner as the printing apparatus 1 of the first embodiment except that a head unit 3A is provided instead of the head unit 3. The head unit 3A is configured in the same manner as the head unit 3 except that the arrangement of the energy emitting section 3c is different and an optical sensor 3g is added.

Figure 12:
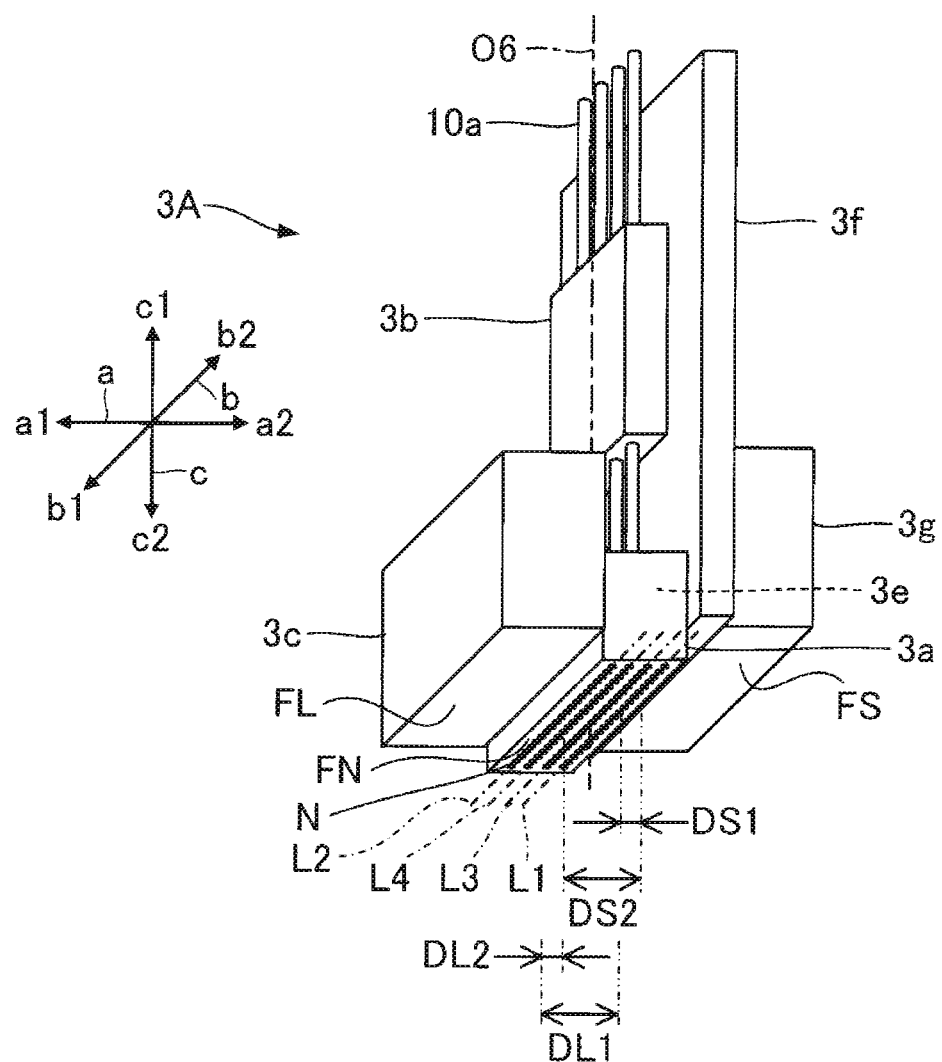
FIG. 12 is a perspective view illustrating a schematic configuration of a head unit used in the third embodiment.

FIG. 12 is a perspective view illustrating a schematic configuration of the head unit 3A used in the third embodiment. As illustrated in FIG. 12, in the head unit 3A, the energy emitting section 3c is arranged at a position in the a1 direction with respect to the head 3a, while the optical sensor 3g is arranged at a position in the a2 direction. Here, the energy emitting section 3c is attached to the support 3f via a member (not illustrated). The optical sensor 3g is attached to the surface of the support 3f facing the a2 direction by screwing or the like.

The optical sensor 3g is a sensor such as an optical displacement sensor or an image pickup device including a light receiving section FS. The light receiving section FS has a surface facing the c2 direction, and is an optical component for introducing light into, for example, a charge coupled device (CCD) image sensor or a complementary MOS (CMOS) image sensor.

For example, the controller 5 corrects the actual moving path of the head 3a based on the output from the optical sensor 3g. The optical sensor 3g may be connected to the computer 7. When the optical sensor 3g is an image pickup device, for example, the output from the optical sensor 3g may be used for other purposes such as teaching the robot 2.

Figure 13:
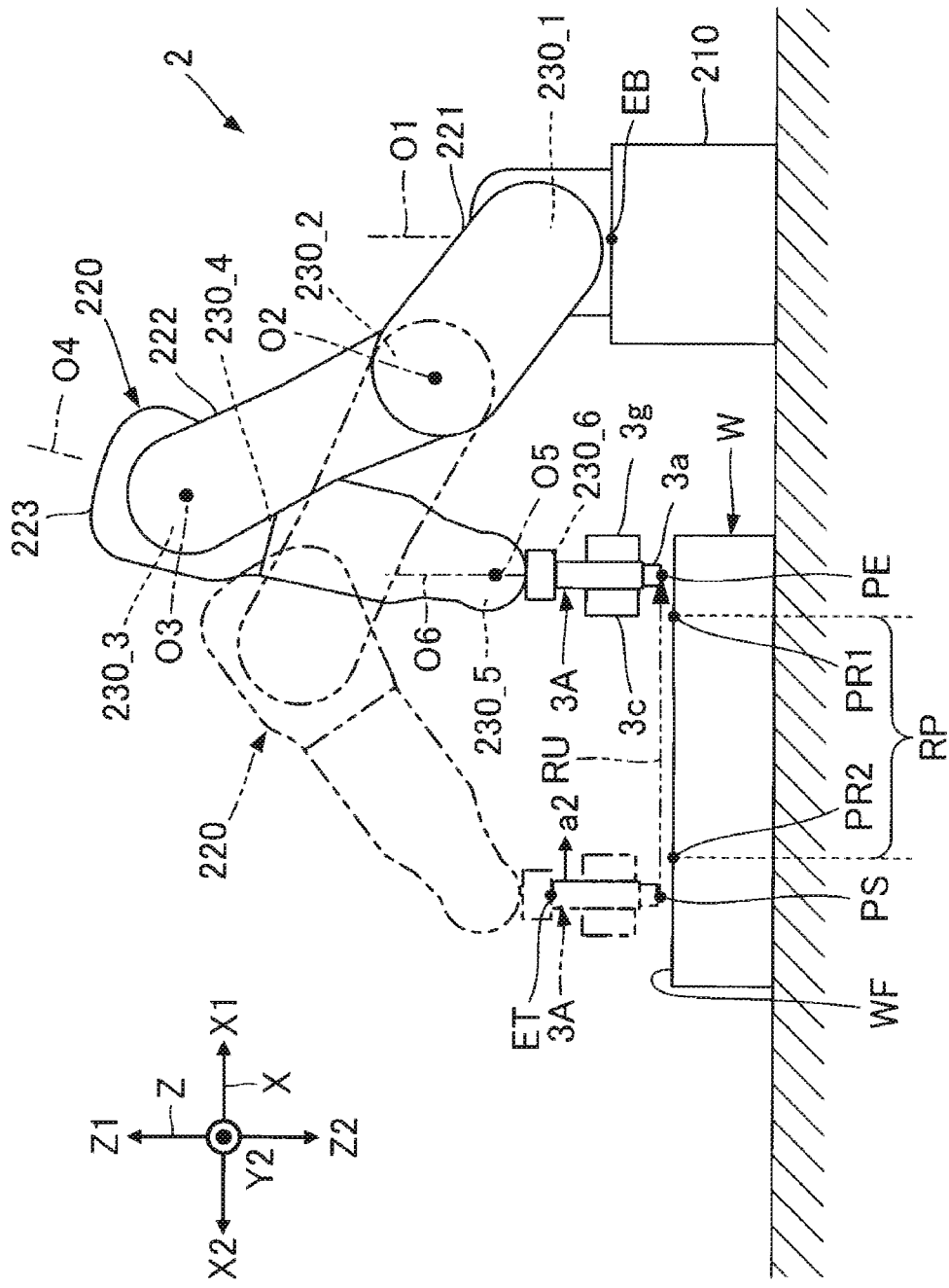
FIG. 13 is a view for describing a printing operation of the printing apparatus according to the third embodiment.

FIG. 13 is a view for describing a printing operation of the printing apparatus 1A according to the third embodiment. Similar to FIG. 4 described above, FIG. 13 illustrates a case where printing is performed on the predetermined region RP of the surface WF of the workpiece W placed at a position in the X2 direction from the base portion 210 of the robot 2 when viewed in the direction along the Y axis.

In the present embodiment, the robot 2 moves the head 3a in a direction approaching the base portion 210. Here, the a2 direction faces forward in the moving direction of the head 3a. Therefore, similar to the first embodiment, the first nozzle row L1, the third nozzle row L3, the fourth nozzle row L4, and the second nozzle row L2 are arranged in this order from the near side to the far side with respect to the base portion 210.

Further, the energy emitting section 3c is positioned behind the head 3a in the moving direction of the head 3a. Therefore, the ink immediately after landing on the surface WF from the head 3a can be irradiated with the energy from the energy emitting section 3c. Further, the optical sensor 3g is positioned in front of the head 3a in the moving direction of the head 3a.

The print quality can also be improved by the above-described third embodiment. In the present embodiment, the printing apparatus 1A has the energy emitting section 3c, but unlike the first embodiment, the distance DL2 between the second nozzle row L2 and the emitting surface FL is less than the distance DL1 between the first nozzle row L1 and the emitting surface FL. Therefore, the period from the landing timing of the second ink on the workpiece W to the energy irradiation timing to the second ink can be shorter than the period from the landing timing of the first ink on the workpiece W to the energy irradiation timing to the first ink. Here, since the brightness of the second ink is lower than the brightness of the first ink, the bleeding on the workpiece W by the second ink tends to be more conspicuous than that by the first ink. Therefore, shortening the period from the landing timing of the second ink on the workpiece W to the energy irradiation timing to the second ink has an effect that the print quality can be improved. Since the bleeding on the workpiece W by the first ink is less conspicuous than that by the second ink, even when the period from the landing timing of the first ink on the workpiece W to the energy irradiation timing to the first ink becomes longer, the problem of deterioration of print quality is unlikely to occur.

Noted that which of the first embodiment and the third embodiment is used for the magnitude relationship between the distance DL1 and the distance DL2 is determined in consideration of the easiness of bleeding of the second ink and the like. For example, when the second ink is likely to cause bleeding, as in the present embodiment, a configuration in which the distance DL2 is less than the distance DL1 is adopted. On the other hand, when the second ink is unlikely to cause bleeding, as in the first embodiment, a configuration in which the distance DL2 is greater than the distance DL1 is adopted.

Further, in the present embodiment, as described above, the printing apparatus 1A further includes the optical sensor 3g. The optical sensor 3g is supported by the distal end ET and includes the light receiving section FS.

Moreover, the distance DS2 between the second nozzle row L2 and the light receiving section FS is greater than the distance DS1 between the first nozzle row L1 and the light receiving section FS. Therefore, the amount of the second ink adhering to the light receiving section FS can be reduced as compared with the amount of the first ink. Here, since the brightness of the second ink is lower than the brightness of the first ink, the second ink is more likely to absorb the light to the light receiving section FS than the first ink. Therefore, reducing the amount of the second ink adhering to the light receiving section FS has an effect that the light receiving efficiency in the light receiving section FS can be improved. Since the first ink is less likely to absorb the light to the light receiving section FS than the second ink, even when the amount of the first ink adhering to the light receiving section FS is large, the problem that the light receiving efficiency in the light receiving section FS is low is unlikely to occur.

4. FOURTH EMBODIMENT

Hereinafter, a fourth embodiment of the present disclosure will be described. In the embodiment illustrated below, elements having the same effects and functions as those of the first embodiment will be given the reference numerals used in the description of the first embodiment, and each of the detailed descriptions thereof will be appropriately omitted.

Figure 14:
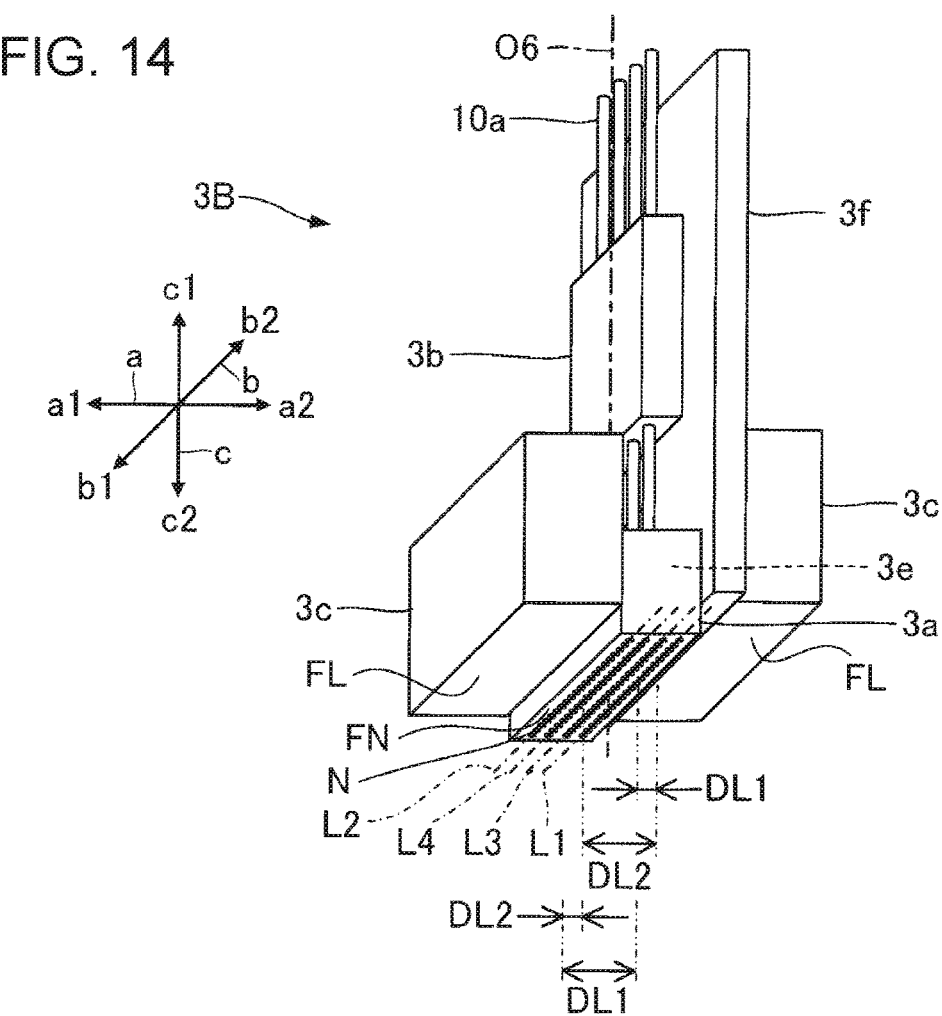
FIG. 14 is a perspective view illustrating a schematic configuration of a head unit used in a fourth embodiment.

FIG. 14 is a perspective view illustrating a schematic configuration of the head unit 3B used in the fourth embodiment. A printing apparatus 1B is configured in the same manner as the printing apparatus 1 of the first embodiment except that a head unit B is provided instead of the head unit 3. As illustrated in FIG. 14, the head unit 3B has two energy emitting sections 3c. Of the two energy emitting sections 3c, one energy emitting section 3c is arranged at the position in the a1 direction with respect to the head 3a, and the other energy emitting section 3c is arranged at the position in the a2 direction with respect to the head 3a.

Figure 15:
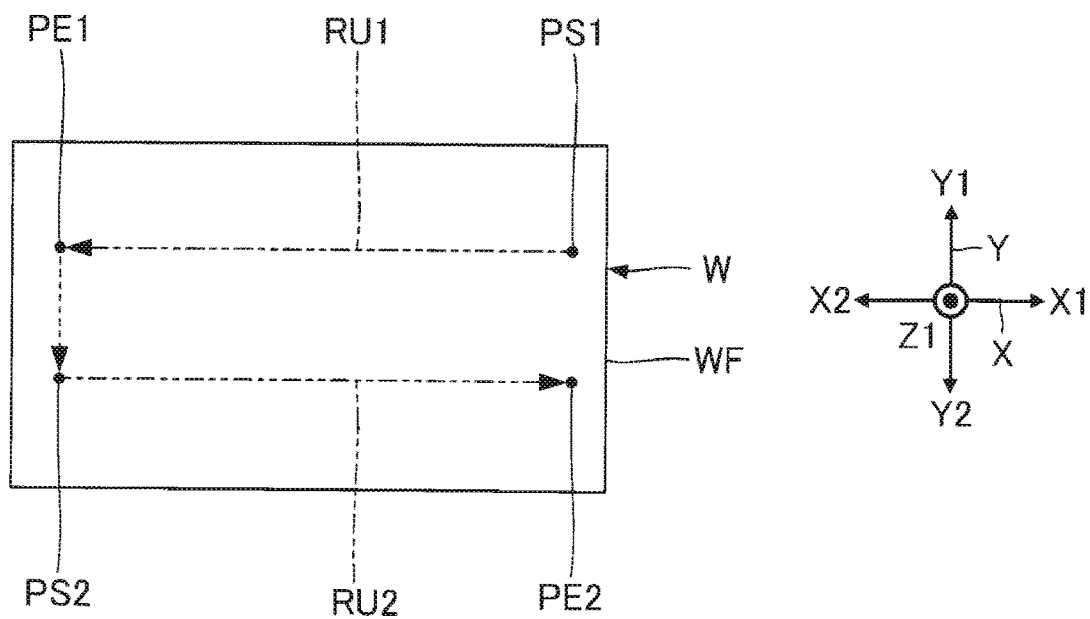
FIG. 15 is a view for describing a moving path of a head in the fourth embodiment.

FIG. 15 is a diagram for describing moving paths RU1 and RU2 of the head 3a in the fourth embodiment. The moving path RU1 is a path from a position PS1 to a position PE1. The robot 2 moves the head 3a in a direction away from the base portion 210 along the moving path RU1. At this time, the a1 direction faces forward in the moving direction of the head 3a. The moving path RU2 is a path from a position PS2 to a position PE2. The robot 2 moves the head 3a in a direction approaching the base portion 210 along the moving path RU2. At this time, the a2 direction faces forward in the moving direction of the head 3a.

Here, although not illustrated, each of the position PS1 and the position PE2 is a position in the X1 direction with respect to the predetermined region RP when viewed in the Z2 direction. Although not illustrated, each of the position PE1 and the position PS2 is a position in the X2 direction with respect to the predetermined region RP when viewed in the Z2 direction.

The print quality can also be improved by the above-described fourth embodiment. In the present embodiment, as described above, the two energy emitting sections 3c are arranged via the head 3a. Therefore, even when printing is performed in either the direction in which the head 3a is away from the base portion 210 or the direction in which the head 3a approaches the base portion 210, while maintaining the relationship between the distance DN1 and the distance DN2 in the same manner as in the first embodiment and the third embodiment, the ink immediately after landing on the workpiece W can be irradiated with energy.

5. MODIFICATION EXAMPLE

Each of the aspects in the above-described examples can be modified in various manners. Specific modifications according to each of the above-described aspects will be described below. Noted that two or more aspects selected in any manner from the following examples can be appropriately combined with each other within a range of not being inconsistent with each other.

5-1. Modification Example 1

In the above-described aspects, the nozzle rows are arranged in the order of the first nozzle row L1, the third nozzle row L3, the fourth nozzle row L4, and the second nozzle row L2 from the near side to the far side with respect to the base portion 210. However, the second nozzle row L2 may be arranged at a position farther to the base portion 210 than the first nozzle row L1, and is not limited to the above-described arrangement. For example, the nozzle rows may be arranged in the order of the first nozzle row L1, the fourth nozzle row L4, the third nozzle row L3, and the second nozzle row L2 from the near side to the far side with respect to the base portion 210.

5-2. Modification Example 2

In the above-described aspect, a configuration in which printing is performed using four types of ink is exemplified, but the configuration may be any configuration using the first ink and the second ink, the configuration is not limited to the configuration, and the present disclosure can also be applied to a configuration in which printing is performed using two types, three types, or five or more types of ink. Further, the first ink may be any ink having a higher brightness than the second ink, and is not limited to the yellow ink. Further, the second ink may be any ink having a lower brightness than the first ink, and is not limited to the black ink.

5-3. Modification Example 3

In the above-described aspect, the configuration using the energy emitting section 3c is exemplified, but the configuration is not limited thereto, and the energy emitting section 3c may be omitted. In this case, for example, another means for emitting light that cures or solidifies the ink on the workpiece may be arranged outside the robot 2.

5-4. Modification Example 4

In the above-described aspect, a configuration using a 6-axis vertical multi-axis robot as a moving mechanism is exemplified, but the configuration is not limited to this configuration. The moving mechanism may be, for example, a vertical multi-axis robot other than the 6-axis robot, or a horizontal multi-axis robot. Further, the arm portion of the robot may have a telescopic mechanism, a linear motion mechanism, or the like in addition to the rotating section configured by the rotating mechanism. However, from the viewpoint of the balance between the print quality in the printing operation and the degree of freedom of the robot operation in the non-printing operation, the robot is preferably a multi-axis robot having 6 or more axes.

5-5. Modification Example 5

In the above-described aspect, a configuration using screwing or the like as a method of fixing the head to the robot is exemplified, but the configuration is not limited to this configuration. For example, the head may be fixed to the robot by gripping the head by a gripping mechanism such as a hand mounted as an end effector of the robot.

What is claimed is:

1. A printing apparatus comprising:
   a head including a first nozzle row in which a plurality of nozzles for ejecting a first ink are arranged and a second nozzle row in which a plurality of nozzles for ejecting a second ink are arranged;
   a robot which includes an arm portion having a distal end, a proximal end, and a plurality of joints, and a base portion coupled to the proximal end, supports the head by the distal end, and changes a position and a posture of the head with respect to a workpiece; and
   a control module configured to control ejection of the first ink and the second ink from the head, wherein
   a brightness of the second ink is lower than a brightness of the first ink, and
   when the head scans over a predetermined region along a moving path, a time at which the first ink is ejected from the first nozzle row to a predetermined position of the predetermined region on the workpiece under control of the control module is defined as a first time, and a time at which the second ink is ejected from the second nozzle row to the predetermined position under control of the control module is defined as a second time, a distance between the distal end and the proximal end at the second time is less than a distance between the distal end and the proximal end at the first time.

2. The printing apparatus according to claim 1, wherein at each of the first time and the second time, a distance between the second nozzle row and the proximal end is greater than a distance between the first nozzle row and the proximal end.

3. The printing apparatus according to claim 1, wherein a state where the distance between the second nozzle row and the proximal end is greater than the distance between the first nozzle row and the proximal end is maintained in both periods, a period during which the head ejects the first ink from the first nozzle row while scanning a predetermined region including the predetermined position on the workpiece with the robot, and a period during which the head ejects the second ink from the second nozzle row while scanning the predetermined region with the robot.

4. The printing apparatus according to claim 1, wherein the head further includes a third nozzle row in which a plurality of nozzles for ejecting a third ink are arranged, a brightness of the third ink is lower than the brightness of the first ink and higher than the brightness of the second ink, and
   a distance between the third nozzle row and the proximal end is greater than a distance between the first nozzle row and the proximal end, and is less than a distance between the second nozzle row and the proximal end, at each of the first time and the second time.

5. The printing apparatus according to claim 1, wherein the head includes a plurality of nozzle rows for ejecting an ink,
   the plurality of nozzle rows include the first nozzle row and the second nozzle row, and
   in any two nozzle rows selected from the plurality of nozzle rows, a brightness of the ink ejected from the nozzle row having a farther distance from the proximal end is lower than a brightness of the ink ejected from the nozzle row having a closer distance to the proximal end.

6. The printing apparatus according to claim 1, further comprising:
   an energy emitting section including an emitting surface supported by the distal end and emitting energy for curing each of the first ink and the second ink, wherein
   a distance between the second nozzle row and the emitting surface is greater than a distance between the first nozzle row and the emitting surface.

7. The printing apparatus according to claim 1, further comprising:

an energy emitting section including an emitting surface supported by the distal end and emitting energy for curing each of the first ink and the second ink, wherein a distance between the second nozzle row and the emitting surface is less than a distance between the first nozzle row and the emitting surface.

8. The printing apparatus according to claim 1, further comprising:

an optical sensor supported by the distal end and including a light receiving section, wherein a distance between the second nozzle row and the light receiving section is greater than a distance between the first nozzle row and the light receiving section.

9. The printing apparatus according to claim 1, wherein regarding a period during which the head scans along a predetermined region including the predetermined position on the workpiece, when a period for ejecting the first ink from the first nozzle row to the predetermined region is defined as a first period, and a period for ejecting the second ink from the second nozzle row to the predetermined region is defined as a second period, wherein a total rotating amount of the plurality of joints in the second period is less than a total rotating amount of the plurality of joints in the first period.

10. The printing apparatus according to claim 1, wherein the first ink is an ink having a highest brightness among the inks ejected from the head.

11. The printing apparatus according to claim 1, wherein the first ink is yellow ink or white ink.

12. The printing apparatus according to claim 1, wherein the second ink is an ink having a lowest brightness among the inks ejected from the head.

13. The printing apparatus according to claim 1, wherein the second ink is black ink.

14. The printing apparatus according to claim 1, wherein the head includes a plurality of nozzle rows for ejecting an ink, and the first nozzle row and the second nozzle row are two nozzle rows arranged farthest from each other among the plurality of nozzle rows.

\* \* \* \* \*